US007266428B2

(12) United States Patent
Alexanian

(10) Patent No.: US 7,266,428 B2
(45) Date of Patent: *Sep. 4, 2007

(54) IRRIGATION CONTROLLER WATER MANAGEMENT WITH TEMPERATURE BUDGETING

(76) Inventor: George Alexanian, 4761 W. Jacquelyn Ave., Fresno, CA (US) 93722

( * ) Notice: Subject to any disclaimer, the term of this patent is extended or adjusted under 35 U.S.C. 154(b) by 0 days.

This patent is subject to a terminal disclaimer.

(21) Appl. No.: 11/336,690

(22) Filed: Jan. 20, 2006

(65) Prior Publication Data
US 2006/0122736 A1 Jun. 8, 2006

Related U.S. Application Data

(63) Continuation-in-part of application No. 10/824,667, filed on Apr. 13, 2004, now Pat. No. 7,058,478.

(60) Provisional application No. 60/465,457, filed on Apr. 25, 2003.

(51) Int. Cl.
*G05D 11/00* (2006.01)
*A01G 25/00* (2006.01)
(52) U.S. Cl. ........................... 700/284; 239/69
(58) Field of Classification Search ............... 700/284; 239/68–70
See application file for complete search history.

(56) References Cited

U.S. PATENT DOCUMENTS

| 3,114,243 | A | 12/1963 | Winters |
| 3,372,899 | A | 3/1968 | McPherson |
| 3,653,595 | A | 4/1972 | Greengard |
| 3,726,477 | A | 4/1973 | Shapiro |
| 3,787,728 | A | 1/1974 | Bayer et al. |

(Continued)

OTHER PUBLICATIONS

Web pages (5 pgs); List of Principal Symbols and Acronyms; 2003.

(Continued)

*Primary Examiner*—M. N. Von Buhr
(74) *Attorney, Agent, or Firm*—Mark D. Miller

(57) ABSTRACT

The present invention provides methods for water conservation with AC, DC, or ambient light powered irrigation controllers without the use of complex ET (evapotranspiration) data or ET related service fees. Programming may consist of the operator entering a preliminary irrigation schedule, and entering the local zip code. The controller then periodically calculates a water budget by comparing current (non ET) local geo-environmental data with stored local geo-environmental data, and then modifies the preliminary schedule using the water budget. A number of embodiments are possible: stand-alone controllers with a temperature sensor attached directly to the microprocessor within that controller, or as a centrally placed CBM (Central Broadcast Module) which calculates a water budget percentage which is transmitted to one or more field controllers by wired or wireless means. Alternately, a TBM (Temperature Budget Module) that is separate from the controller is connected between the controller outputs and the valves, or mounted at the valves themselves. The TBM periodically calculates the water budget, monitors the controller outputs and adjusts the irrigation schedule based upon the water budget ratio. Because of its flexible capabilities with AC, DC, solar, or ambient light powered controllers, as a centrally broadcast water budget ratio in a wired or wireless configuration, or as an add-on to existing controllers or valves, its programming simplicity and close approximation to ET without its complications and cost, the present invention has the potential to save more water and minimize runoff than currently available ET methods.

95 Claims, 17 Drawing Sheets

U.S. PATENT DOCUMENTS

| | | | |
|---|---|---|---|
| 3,902,825 A | 9/1975 | Quillen | |
| 4,010,898 A | 3/1977 | Williams | |
| 4,146,049 A | 3/1979 | Kruse | |
| 4,176,395 A | 11/1979 | Evelyn-Veere et al. | 700/284 |
| 4,185,650 A | 1/1980 | Neves | |
| 4,208,630 A | 6/1980 | Martinez | |
| 4,209,131 A | 6/1980 | Barash | |
| RE31,023 E | 9/1982 | Hall, III | |
| 4,396,149 A | 8/1983 | Hirsch | |
| 4,431,338 A | 2/1984 | Homabrook | |
| 4,526,034 A | 7/1985 | Campbell | |
| 4,545,396 A | 10/1985 | Miller et al. | 137/78.3 |
| 4,548,225 A | 10/1985 | Busalacchi | |
| 4,626,984 A | 12/1986 | Unruh | |
| 4,646,224 A | 2/1987 | Ransburg | |
| 4,684,920 A | 8/1987 | Reiter | |
| 4,691,341 A | 9/1987 | Knoble | |
| 4,709,585 A | 12/1987 | Altenhofen | |
| 4,755,942 A | 7/1988 | Gardner et al. | |
| 4,837,499 A | 6/1989 | Scherer, III | |
| 4,856,227 A | 8/1989 | Oglevee | |
| 4,858,377 A | 8/1989 | Oglevee | |
| 4,876,647 A | 10/1989 | Gardner et al. | |
| 4,921,001 A | 5/1990 | Pittsinger | 137/78.2 |
| 4,922,433 A | 5/1990 | Mark | |
| 4,934,400 A | 6/1990 | Cuming | |
| 4,952,868 A | 8/1990 | Scherer | |
| 4,962,522 A | 10/1990 | Marian | |
| 4,967,789 A | 11/1990 | Kypris | |
| 4,992,942 A | 2/1991 | Bauerle et al. | 700/284 |
| 5,023,787 A | 6/1991 | Evelyn-Veere | |
| 5,097,861 A | 3/1992 | Hopkins et al. | 137/78.3 |
| 5,121,340 A | 6/1992 | Campbell | |
| 5,148,826 A | 9/1992 | Bakhshaei | |
| 5,208,855 A | 5/1993 | Marian | |
| 5,229,937 A | 7/1993 | Evelyn-Veere | |
| 5,244,177 A | 9/1993 | Campbell | |
| 5,341,831 A | 8/1994 | Zur | |
| 5,444,611 A | 8/1995 | Woytowitz et al. | 700/16 |
| 5,445,176 A | 8/1995 | Goff | |
| 5,465,904 A | 11/1995 | Vaello | |
| 5,479,339 A | 12/1995 | Miller | |
| 5,638,847 A | 6/1997 | Hock, Jr. et al. | |
| 5,696,671 A | 12/1997 | Oliver | |
| 5,839,660 A | 11/1998 | Morganstern et al. | |
| 5,853,122 A | 12/1998 | Caprio | |
| 5,870,302 A | 2/1999 | Oliver | |
| 5,960,813 A | 10/1999 | Sturman et al. | 137/78.3 |
| 6,076,740 A | 6/2000 | Townsend | |
| 6,102,061 A | 8/2000 | Addink | |
| 6,145,755 A | 11/2000 | Feltz | |
| 6,227,220 B1 | 5/2001 | Addink | |
| 6,298,285 B1 | 10/2001 | Addink et al. | |
| 6,314,340 B1 | 11/2001 | Mecham et al. | 700/284 |
| 6,452,499 B1 | 9/2002 | Runge et al. | |
| 6,453,215 B1 | 9/2002 | Lavoie | |
| 6,453,216 B1 | 9/2002 | McCabe et al. | |
| 6,585,168 B1 | 7/2003 | Caprio | |
| 6,748,327 B1 | 6/2004 | Watson | 702/3 |
| 6,823,239 B2 | 11/2004 | Sieminski | |
| 6,892,113 B1 | 5/2005 | Addink et al. | |
| 6,892,114 B1 | 5/2005 | Addink et al. | |
| 6,895,987 B2 | 5/2005 | Addink et al. | |
| 6,944,523 B2 | 9/2005 | Addink | |
| 6,947,811 B2 | 9/2005 | Addink et al. | |
| 6,950,728 B1 | 9/2005 | Addink et al. | |
| 6,963,808 B1 | 11/2005 | Addick et al. | |
| 2001/0049563 A1 | 12/2001 | Addink et al. | |
| 2002/0010516 A1 | 1/2002 | Addink | |
| 2002/0027504 A1 | 3/2002 | Davis | |
| 2002/0060631 A1 | 5/2002 | Runge et al. | |
| 2002/0072829 A1 | 6/2002 | Addink et al. | |
| 2003/0025400 A1 | 2/2003 | Hall | 307/134 |
| 2003/0080199 A1 | 5/2003 | Condreva | |
| 2003/0183018 A1 | 10/2003 | Addink et al. | |
| 2004/0039489 A1 | 2/2004 | Moore et al. | |
| 2004/0117070 A1* | 6/2004 | Barker | 700/284 |
| 2004/0217189 A1 | 11/2004 | Regli | 239/69 |
| 2005/0250440 A1* | 11/2005 | Zhou et al. | 455/12.1 |

OTHER PUBLICATIONS

Article (3 pgs); Methods to Calculate Evapotranspiration Differences and Choices; by Cattaneo & Upham.
Article (2 pgs); Water-Efficient Landscaping; 2001.
Article. (2 pgs); Residential Weather-Based Irrigation Scheduling; Jun. 2001; by Hunt and Lessick.
Article (19 pgs); Appendix G Deficit Irrigation Practice; Oct. 2002.
Article (1 pg); A Simple Evapotranspiration Model for Hawaii: The Hargreaves Model; by Wu; May 1997.
Web page (1 pg); Technical Information-Using Evapotran-spiration Data; Nov. 2002; by Austin Lawn Sprinkler Association.
Chart (1 pg); ET Different Formula.
Preface page (1 pg);by USFAO; Feb. 2003; web page.

* cited by examiner

| Month | Temp Budget | ET |
|---|---|---|
| Jan | 25.61% | 23.18% |
| Feb | 32.61% | 29.82% |
| Mar | 56.31% | 53.62% |
| Apr | 72.02% | 72.23% |
| May | 88.90% | 88.47% |
| Jun | 97.90% | 96.19% |
| Jul | 100.00% | 100.00% |
| Aug | 94.09% | 92.93% |
| Sep | 69.78% | 70.39% |
| Oct | 51.06% | 53.07% |
| Nov | 34.09% | 29.09% |
| Dec | 25.98% | 25.67% |

Extraterrestrial Radiation (RA) Expressed in Equivalent Evaporation (in mm/day)

| January (1) | February (2) | March (3) | April (4) | May (5) | June (6) | July (7) | August (8) | September (9) | October (10) | November (11) | December (12) | Latitude (degrees) (13) |
|---|---|---|---|---|---|---|---|---|---|---|---|---|
| (a) Northern Hemisphere ||||||||||||||
| 3.8 | 6.1 | 9.4 | 12.7 | 15.8 | 17.1 | 16.4 | 14.1 | 10.9 | 7.4 | 4.5 | 3.2 | 50 |
| 4.3 | 6.6 | 9.8 | 13.0 | 15.9 | 17.2 | 16.5 | 14.3 | 11.2 | 7.8 | 5.0 | 3.7 | 48 |
| 4.9 | 7.1 | 10.2 | 13.3 | 16.0 | 17.2 | 16.6 | 14.5 | 11.5 | 8.3 | 5.5 | 4.3 | 46 |
| 5.3 | 7.6 | 10.6 | 13.7 | 16.1 | 17.2 | 16.6 | 14.7 | 11.9 | 8.7 | 6.0 | 4.7 | 44 |
| 5.9 | 8.1 | 11.0 | 14.0 | 16.2 | 17.3 | 16.7 | 15.0 | 12.2 | 9.1 | 6.5 | 5.2 | 42 |
| 6.4 | 8.6 | 11.4 | 14.3 | 16.4 | 17.3 | 16.7 | 15.2 | 12.5 | 9.6 | 7.0 | 5.7 | 40 |
| 6.9 | 9.0 | 11.8 | 14.5 | 16.4 | 17.2 | 16.7 | 15.3 | 12.8 | 10.0 | 7.5 | 6.1 | 38 |
| 7.4 | 9.4 | 12.1 | 14.7 | 16.4 | 17.2 | 16.7 | 15.4 | 13.1 | 10.6 | 8.0 | 6.6 | 36 |
| 7.9 | 9.8 | 12.4 | 14.8 | 16.5 | 17.1 | 16.8 | 15.5 | 13.4 | 10.8 | 8.5 | 7.2 | 34 |
| 8.3 | 10.2 | 12.8 | 15.0 | 16.5 | 17.0 | 16.8 | 15.6 | 13.6 | 11.2 | 9.0 | 7.8 | 32 |
| 8.8 | 10.7 | 13.1 | 15.2 | 16.5 | 17.0 | 16.8 | 15.7 | 13.9 | 11.6 | 9.5 | 8.3 | 30 |
| 9.3 | 11.1 | 13.4 | 15.3 | 16.5 | 16.8 | 16.7 | 15.7 | 14.1 | 12.0 | 9.9 | 8.8 | 28 |
| 9.8 | 11.5 | 13.7 | 15.3 | 16.4 | 16.7 | 16.6 | 15.7 | 14.3 | 12.3 | 10.3 | 9.3 | 26 |
| 10.2 | 11.9 | 13.9 | 15.4 | 16.4 | 16.6 | 16.5 | 15.8 | 14.5 | 12.6 | 10.7 | 9.7 | 24 |
| 10.7 | 12.3 | 14.2 | 15.5 | 16.3 | 16.4 | 16.4 | 15.8 | 14.6 | 13.0 | 11.1 | 10.2 | 22 |
| 11.2 | 12.7 | 14.4 | 15.6 | 16.3 | 16.4 | 16.3 | 15.9 | 14.8 | 13.3 | 11.6 | 10.7 | 20 |
| 11.6 | 13.0 | 14.6 | 15.6 | 16.1 | 16.1 | 16.8 | 15.8 | 14.9 | 13.6 | 12.0 | 11.1 | 18 |
| 12.0 | 13.3 | 14.7 | 15.6 | 16.0 | 15.9 | 15.9 | 15.7 | 15.0 | 13.9 | 12.4 | 11.6 | 16 |
| 12.4 | 13.6 | 14.9 | 15.7 | 15.8 | 15.7 | 15.7 | 15.7 | 15.1 | 14.1 | 12.8 | 12.0 | 14 |
| 12.8 | 13.9 | 15.1 | 15.7 | 15.7 | 15.5 | 15.5 | 15.6 | 15.2 | 14.4 | 13.3 | 12.5 | 12 |
| 13.2 | 14.2 | 15.3 | 15.7 | 15.5 | 15.3 | 15.3 | 15.5 | 15.3 | 14.7 | 13.6 | 12.9 | 10 |
| 13.6 | 14.5 | 15.3 | 15.6 | 15.3 | 15.0 | 15.1 | 15.4 | 15.3 | 14.8 | 13.9 | 13.3 | 8 |
| 13.9 | 14.8 | 15.4 | 15.4 | 15.1 | 14.7 | 14.9 | 15.2 | 15.3 | 15.0 | 14.2 | 13.7 | 6 |
| 14.3 | 15.0 | 15.5 | 15.5 | 14.9 | 14.4 | 14.6 | 15.1 | 15.3 | 15.1 | 14.5 | 14.1 | 4 |
| 14.7 | 15.3 | 15.6 | 15.3 | 14.6 | 14.2 | 14.3 | 14.9 | 15.3 | 15.3 | 14.8 | 14.4 | 2 |
| 15.0 | 15.5 | 15.7 | 15.3 | 14.4 | 13.9 | 14.1 | 14.8 | 15.3 | 15.4 | 15.1 | 14.8 | 0 |
| (b) Southern Hemisphere ||||||||||||||
| 17.5 | 14.7 | 10.9 | 7.0 | 4.2 | 3.1 | 3.5 | 5.5 | 8.9 | 12.9 | 16.5 | 18.2 | 50 |
| 17.6 | 14.9 | 11.2 | 7.5 | 4.7 | 3.5 | 4.0 | 6.0 | 9.3 | 13.2 | 16.6 | 18.2 | 48 |
| 17.7 | 15.1 | 11.5 | 7.9 | 5.2 | 4.0 | 4.4 | 6.5 | 9.7 | 13.4 | 16.7 | 18.3 | 46 |
| 17.8 | 15.3 | 11.9 | 8.4 | 5.7 | 4.4 | 4.9 | 6.9 | 10.2 | 13.7 | 16.7 | 18.3 | 44 |
| 17.9 | 15.5 | 12.2 | 8.8 | 6.1 | 4.9 | 5.4 | 7.4 | 10.6 | 14.0 | 16.8 | 18.3 | 42 |
| 17.9 | 15.7 | 12.5 | 9.2 | 6.6 | 5.3 | 5.9 | 7.9 | 11.0 | 14.2 | 16.9 | 18.3 | 40 |
| 17.9 | 15.8 | 12.8 | 9.6 | 7.1 | 5.8 | 6.3 | 8.3 | 11.4 | 14.4 | 17.0 | 18.3 | 38 |
| 17.9 | 16.0 | 13.2 | 10.1 | 7.5 | 6.3 | 6.8 | 8.8 | 11.7 | 14.6 | 17.0 | 18.2 | 36 |
| 17.8 | 16.1 | 13.5 | 10.5 | 8.0 | 6.8 | 7.2 | 9.2 | 12.0 | 14.9 | 17.1 | 18.2 | 34 |
| 17.8 | 16.2 | 13.8 | 10.9 | 8.5 | 7.3 | 7.7 | 9.6 | 12.4 | 15.1 | 17.2 | 18.1 | 32 |
| 17.8 | 16.4 | 14.0 | 11.3 | 8.9 | 7.8 | 8.1 | 10.1 | 12.7 | 15.3 | 17.3 | 18.1 | 30 |
| 17.7 | 16.4 | 14.3 | 11.6 | 9.3 | 8.2 | 8.6 | 10.4 | 13.0 | 15.4 | 17.2 | 17.9 | 28 |
| 17.6 | 16.4 | 14.4 | 12.0 | 9.7 | 8.7 | 9.1 | 10.9 | 13.2 | 15.5 | 17.2 | 17.8 | 26 |
| 17.5 | 16.5 | 14.6 | 12.3 | 10.2 | 9.1 | 9.5 | 11.2 | 13.4 | 15.6 | 17.1 | 17.7 | 24 |
| 17.4 | 16.5 | 14.8 | 12.6 | 10.6 | 9.6 | 10.0 | 11.6 | 13.7 | 15.7 | 17.0 | 17.5 | 22 |
| 17.3 | 16.5 | 15.0 | 13.0 | 11.0 | 10.0 | 10.4 | 12.0 | 13.9 | 15.8 | 17.0 | 17.4 | 20 |
| 17.1 | 16.5 | 15.1 | 13.2 | 11.4 | 10.4 | 10.8 | 12.3 | 14.1 | 15.8 | 16.8 | 17.1 | 18 |
| 16.9 | 16.4 | 15.2 | 13.5 | 11.7 | 10.8 | 11.2 | 12.6 | 14.3 | 15.8 | 16.7 | 16.8 | 16 |
| 16.7 | 16.4 | 15.3 | 13.7 | 12.1 | 11.2 | 11.6 | 12.9 | 14.5 | 15.8 | 16.5 | 16.6 | 14 |
| 16.6 | 16.3 | 15.4 | 14.0 | 12.5 | 11.6 | 12.0 | 13.2 | 14.7 | 15.8 | 16.4 | 16.5 | 12 |
| 16.4 | 16.3 | 15.5 | 14.2 | 12.8 | 12.0 | 12.4 | 13.5 | 14.8 | 15.9 | 16.2 | 16.2 | 10 |
| 16.1 | 16.1 | 15.5 | 14.4 | 13.1 | 12.4 | 12.7 | 13.7 | 14.9 | 15.8 | 16.0 | 16.0 | 8 |
| 15.8 | 16.0 | 15.6 | 14.7 | 13.4 | 12.8 | 13.1 | 14.0 | 15.0 | 15.7 | 15.8 | 15.7 | 6 |
| 15.5 | 15.8 | 15.6 | 14.9 | 13.8 | 13.2 | 13.4 | 14.3 | 15.1 | 15.6 | 15.5 | 15.4 | 4 |
| 15.3 | 15.7 | 15.7 | 15.1 | 14.1 | 13.5 | 13.7 | 14.5 | 15.2 | 15.5 | 15.3 | 15.1 | 2 |
| 15.0 | 15.5 | 15.7 | 15.3 | 14.4 | 13.9 | 14.1 | 14.8 | 15.3 | 15.4 | 15.1 | 14.8 | 0 |

Fig. 6

**Irrigation Association – Smart Water Application Technology
Climatologically Based Controllers
Evaluation Protocol: 6th Draft (December 1, 2004)**
International Center for Water Technology

| | Manufacturer | Alex Tronix |
|---|---|---|
| Project Identification | Model Number | Smart Clock |
| | Serial Number | 01002 |
| | Evaluated By | JO, EN |
| | Date | October 1, 2005 – October 31, 2005 |
| | Weather Station | CIMIS 80 |
| | Reference No. | C001205 |
| | Comments | |

| | Parameter | Zone #1 | Zone #2 | Zone #3 | Zone #4 | Zone #5 | Zone #6 |
|---|---|---|---|---|---|---|---|
| Input Data | Soil Type | Loam | Silty Clay | Loamy Sand | Sandy Loam | Clay Loam | Clay |
| | Vegetation | Fescue-75% | Bermuda-Full | Ground Cover | Woody Shrubs | Trees & GC | Bermuda-Full |
| | Slope, % | 6.0 | 10.0 | 8.0 | 12.0 | 2.0 | 20.0 |
| | Root Zone Stor., in. | 0.85 | 0.55 | 0.90 | 2.00 | 2.25 | 0.55 |
| | Precip Rate, in./h | 1.60 | 1.60 | 1.40 | 1.40 | 0.20 | 0.35 |
| | Efficiency, % | 55 | 60 | 70 | 75 | 80 | 65 |
| | Area, SQ-Ft | 1000 | 1200 | 800 | 500 | 650 | 1600 |
| | Soil Intake Rate, in./h | 0.35 | 0.15 | 0.50 | 0.40 | 0.20 | 0.10 |
| | Kc | 0.50 | 0.60 | 0.55 | 0.40 | 0.61 | 0.60 |
| | ASA, in. | 0.25 | 0.16 | 0.25 | 0.24 | 0.26 | 0.10 |
| | Max. Run Time, min. | 12.0 | 6.6 | 17.3 | 14.4 | N/A | 24.0 |

| | | Zone #1 | Zone #2 | Zone #3 | Zone #4 | Zone #5 | Zone #6 |
|---|---|---|---|---|---|---|---|
| Evaluation Summary | ETo, in. | 3.95 | 3.95 | 3.95 | 3.95 | 3.95 | 3.95 |
| | ETc. in. | 1.97 | 2.37 | 2.19 | 1.58 | 2.40 | 2.37 |
| | Gross Rainfall, in. | 0.09 | 0.09 | 0.09 | 0.09 | 0.09 | 0.09 |
| | Net Rainfall, in. | 0.08 | 0.08 | 0.08 | 0.08 | 0.08 | 0.08 |
| | Eff. Rainfall, in. | 0.08 | 0.08 | 0.08 | 0.08 | 0.08 | 0.08 |
| | Gross Irr., in. | 4.56 | 4.44 | 3.36 | 2.00 | 2.76 | 4.28 |
| | Direct Runoff, in. | 0.00 | 0.00 | 0.00 | 0.00 | 0.00 | 0.00 |
| | Soak Runoff, in. | 0.00 | 0.00 | 0.00 | 0.00 | 0.00 | 0.00 |
| | Effective Irr., in. | 2.48 | 2.84 | 2.36 | 1.48 | 2.16 | 2.48 |
| | Deficit, in. | 0.00 | 0.00 | 0.00 | 0.00 | 0.00 | 0.00 |
| | Surplus, in. | 0.18 | 0.00 | 0.00 | 0.00 | 0.00 | 0.00 |
| | Irr. Adequacy, % | 100.0 | 100.0 | 100.0 | 100.0 | 100.0 | 100.0 |
| | Sch. Eff., % | 92.7 | 100.0 | 100.0 | 100.0 | 100.0 | 100.0 |
| | Overall Eff., % | 51.0 | 60.0 | 70.0 | 75.0 | 80.0 | 65.0 |
| | Rainfall Eff., % | 100.0 | 100.0 | 100.0 | 100.0 | 100.0 | 100.0 |
| | Cur. Moist. Bal., in. | 0.81 | 0.54 | 0.70 | 0.96 | 0.97 | 0.54 |

Fig. 9

**Irrigation Association – Smart Water Application Technology
Climatologically Based Controllers
Evaluation Protocol: 6th Draft (December 1, 2004)**
International Center for Water Technology <table>
<tr><td rowspan="8">Project Identification</td><td>Manufacturer</td><td colspan="6">Alex Tronix</td></tr>
<tr><td>Model Number</td><td colspan="6">Smart Clock</td></tr>
<tr><td>Serial Number</td><td colspan="6">01002</td></tr>
<tr><td>Evaluated By</td><td colspan="6">JO, EN</td></tr>
<tr><td>Date</td><td colspan="6">September 1, 2005 – September 30, 2005</td></tr>
<tr><td>Weather Station</td><td colspan="6">CIMIS 80</td></tr>
<tr><td>Reference No.</td><td colspan="6">C001205</td></tr>
<tr><td>Comments</td><td colspan="6"></td></tr>
</table>

| | Parameter | Zone #1 | Zone #2 | Zone #3 | Zone #4 | Zone #5 | Zone #6 |
|---|---|---|---|---|---|---|---|
| | Soil Type | Loam | Silty Clay | Loamy Sand | Sandy Loam | Clay Loam | Clay |
| | Vegetation | Fescue-75% | Bermuda-Full | Ground Cover | Woody Shrubs | Trees & GC | Bermuda-Full |
| | Slope, % | 6.0 | 10.0 | 8.0 | 12.0 | 2.0 | 20.0 |
| Input Data | Root Zone Stor., in. | 0.85 | 0.55 | 0.90 | 2.00 | 2.25 | 0.55 |
| | Precip Rate, in./h | 1.60 | 1.60 | 1.40 | 1.40 | 0.20 | 0.35 |
| | Efficiency, % | 55 | 60 | 70 | 75 | 80 | 65 |
| | Area, SQ-Ft | 1000 | 1200 | 800 | 500 | 650 | 1600 |
| | Soil Intake Rate, in./h | 0.35 | 0.15 | 0.50 | 0.40 | 0.20 | 0.10 |
| | Kc | 0.56 | 0.64 | 0.55 | 0.40 | 0.61 | 0.64 |
| | ASA, in. | 0.25 | 0.16 | 0.26 | 0.24 | 0.26 | 0.10 |
| | Max. Run Time, min. | 12.0 | 6.6 | 17.3 | 14.4 | N/A | 24.0 |
| | ETo, in. | 5.56 | 5.56 | 5.56 | 5.56 | 5.56 | 5.56 |
| | ETc, in. | 3.15 | 3.56 | 3.04 | 2.23 | 3.40 | 3.56 |
| | Gross Rainfall, in. | 0.04 | 0.04 | 0.04 | 0.04 | 0.04 | 0.04 |
| | Net Rainfall, in. | 0.03 | 0.03 | 0.03 | 0.03 | 0.03 | 0.03 |
| | Eff. Rainfall, in. | 0.03 | 0.03 | 0.03 | 0.03 | 0.03 | 0.03 |
| | Gross Irr., in. | 6.64 | 5.95 | 4.88 | 2.04 | 3.84 | 5.75 |
| Evaluation Summary | Direct Runoff, in. | 0.00 | 0.00 | 0.00 | 0.00 | 0.00 | 0.00 |
| | Soak Runoff, in. | 0.00 | 0.00 | 0.00 | 0.00 | 0.00 | 0.00 |
| | Effective Irr., in. | 3.68 | 3.57 | 3.44 | 1.52 | 3.08 | 3.64 |
| | Deficit, in. | 0.00 | 0.00 | 0.00 | 0.06 | 0.00 | 0.00 |
| | Surplus, in. | 0.13 | 0.01 | 0.01 | 0.00 | 0.00 | 0.00 |
| | Irr. Adequacy, % | 100.0 | 100.0 | 100.0 | 97.3 | 100.0 | 100.0 |
| | Sch. Eff., % | 96.5 | 99.7 | 99.7 | 100.0 | 100.0 | 100.0 |
| | Overall Eff., % | 53.1 | 59.8 | 69.8 | 75.0 | 80.0 | 65.0 |
| | Rainfall Eff., % | 100.0 | 100.0 | 100.0 | 100.0 | 100.0 | 100.0 |
| | Cur. Moist. Bal., in. | 0.85 | 0.55 | 0.81 | 0.41 | 0.85 | 0.45 |

Fig. 10

IRRIGATION CONTROLLER WATER MANAGEMENT WITH TEMPERATURE BUDGETING

This is a continuation-in-part of U.S. Utility patent application Ser. No. 10/824,667 filed on Apr. 13, 2004, now U.S. Pat. No. 7,058,478, which claims the benefit of U.S. Provisional Application No. 60/465,457 filed on Apr. 25, 2003, both of which are incorporated herein by this reference.

BACKGROUND OF THE INVENTION

1. Field of the Invention

The present invention relates to the management and conservation of irrigation water, primarily for, but not limited to, residential and commercial landscaping applications, and more specifically, to a greatly simplified method known as Temperature Budgeting (TB) for doing so based upon seasonal temperature variations and geographic locations.

2. Description of the Prior Art

Many regions of the United States lack sufficient water resources to satisfy all of their competing agricultural, urban, commercial and environmental needs. The "California Water Plan Update, Bulletin 160-98," published by the California Department of Water Resources using 1995 calendar year data, estimated that approximately 121.1 million acre feet (maf) of water is needed to satisfy the annual water needs of the State of California alone. Of this amount, approximately forty-six percent is required for environmental purposes, forty-three percent for agricultural purposes, and eleven percent (approximately 13.3 maf) for usage in urban areas. The Bulletin further estimated that California suffers a shortage of 1.6 maf during normal years, and 5.1 maf in drought years. These shortages are expected to increase steadily through the year 2020 due to expected significant increases in the state population.

At the Feb. 17, 2004, EPA-sponsored "Water Efficient Product Market Enhancement Program" in Phoenix, Ariz., for landscaping irrigation systems and controllers, it was projected that thirty-six states will have severe water shortages by the year 2010. A significant portion of this projected shortage was attributed to user neglect and irrigation controller inefficiency. The 2003 California census revealed that there were over twenty million single family residences and apartments within the state. The California Urban Water Conservation Council estimated that the average household utilized one-half acre foot of water (162,500 gallons) annually, and that fifty-five percent (89,375 gallons) of this amount was used for landscape irrigation. It further estimated that approximately one-third of the irrigation water was wasted, either due to inefficient irrigation systems or inadequate controller programming, oftentimes due in part to complicated controller programming procedures required of the operator. This results in a total annual waste of 1.81 maf of water for California households alone. Excessive water usages in municipal and commercial areas, golf courses and schools further contribute to the water shortage.

Such water shortages have forced many municipalities to enact strict water conservation measures. For its part, the agricultural industry has responded to this shortage by resorting to drip, micro and other low-volume irrigation systems. Urban communities have imposed strict irrigation schedules, and required the installation of water meters and auditors to enforce those schedules. Commercial and environmental users have enacted similar measures. However, there is no consensus among these various consumers as to the most effective water conservation method or automated control system.

Residential and commercial irrigation consumers are responsible for a significant percentage of wasted water. A report entitled "Water Efficient Landscaping" by the United States Environmental Protection Agency (EPA), dated September 2002, publication number EPA832-F-02-002, states the following: "[a]ccording to the U.S. Geological Survey, of the 26 billion gallons of water consumed daily in the United States (Amy Vickers, 2002 "Handbook of Water Use and Conservation"), approximately 7.8 billion gallons, or 30% is devoted to outdoor uses. The majority of this is used for landscaping"

A significant reason for this over-utilization of landscape water was revealed in a marketing study conducted by the Irrigation Association (IA) and presented at the 2003 IA "Smart Water Application Technology" conference in San Diego, Calif. The study indicated that most consumers typically adjust their irrigation schedule only two to five times per year, rather than on a daily or weekly basis, regardless of changes in environmental conditions. The relatively high cost of labor in many municipalities further prohibits frequent manual adjustments of irrigation controllers. This generally results in over-irrigation and runoff, particularly during the off-seasons, oftentimes by as much as one to two hundred percent. Furthermore, in municipalities that limit irrigation to certain days or intervals, the common practice is to over-water during the permitted watering periods in order to "carry over" until the next watering period. However, this practice is counter-productive, in that severe over-irrigation results in increased water run-off and evaporation.

Soil moisture sensing devices and other methods of water conservation, have been available for decades, but have enjoyed only limited success. Such devices and methods generally call for inserting moisture sensors into the soil to measure the soil moisture content. Newer soil moisture sensing technologies have more recently been developed, and claim to be theoretically accurate in measuring plant water needs. However, regardless of the level of technology, such devices and methods are often problematic due to the location and number of sensors necessary to obtain accurate soil moisture readings, the high costs of installing and maintaining the sensors, and the integrity and reliability of the sensors' data.

Other irrigation controllers utilize meteorological data to estimate the evapotranspiration, or ET, for a particular region. Some of these controllers are manufactured by Aqua Conserve, Weathermatic, Rain Master, and ET Water Systems, among others, whose ET methods were reviewed by the Bureau of Reclamation in their May 2004 report entitled "Weather Based Technologies for Residential Irrigation Scheduling". This ET represents the amount of water needed by plants to replace water lost through plant absorption and evaporation, and is expressed in inches or millimeters of water per day. The United States Food and Agriculture Office (USFAO), in its Irrigation and Drainage Paper No. 24, entitled "Crop Water Requirements," noted that "a large number of more or less empirical methods have been developed over the last fifty years by numerous scientists and specialists worldwide to estimate ET from different climatic variables."

There are at least 15 different ET formulas. Each of these formulas provides a different result for the reference ET (ETo). In their paper entitled "Methods to Calculate Evapotranspiration: Differences and Choices," Diego Cattaneo and Luke Upham published a four-year comparison of four different ETo formulas—the Penman-Monteith formula, the Schwab formula, the Penman formula, and the Penman program. Using the same four year data but different weather parameters and algorithms, the four theoretical ET calculations shows results that sometimes vary by as much as seventy-percent (See FIG. 8).

Irrespective of these variations, the Penman-Monteith formula (which appears to vary as much as 70% at certain times from the other three ET calculations) is currently recognized as the "standard" by both the USFAO and California Irrigation Management Information System (CIMIS), with variances of less than twenty percent from this ET considered ideal. The Penman-Monteith formula is as follows:

$$ETo = \frac{\Delta(Rn - G)}{\lambda[\Delta + Y(1 + CdU2)]} + \frac{Y\frac{37}{Ta + 273.16}U2(Es - Ea)}{\Delta + Y(1 + CdU2)}$$

The variables within this formula represent the following:
ETo=grass reference evapotranspiration in millimeters per day.
$\Delta$=slope of saturation vapor pressure curve kPa° C. at the mean air temperature.
Rn=net radiation (MJm$^{-2}$h$^{-1}$).
G=soil heat flux density (MJm$^{-2}$h$^{-1}$).
Y=psychrometric constant (kPa° C.).
Ta=mean hourly air temperature (° C.).
U2=wind speed at two meters (m s$^{-1}$).
Es=saturation vapor pressure (kPa) at the mean hourly air temperature in ° C.
Ea=actual vapor pressure (kPa) at the mean hourly air temperature in ° C.
$\lambda$=latent heat of vaporization (MJkg$^{-1}$).
Cd=bulk surface resistance and aerodynamics resistance coefficient.

The simplest ET formula is the Hargreaves formula proposed by the College of Tropical Agriculture and Human Resources at the University of Hawaii at Manoa. Its equation is described in the College's Fact Sheet Engineer's Notebook No. 106, published May 1997, in an article entitled "[a] Simple Evapotranspiration Model for Hawaii," as follows:
ETo=0.0135(T+17.18)Rs
The variables within this formula represent the following:
ETo=potential daily evapotranspiration in mm/day.
T=mean daily temperature (° C.).
Rs=incident solar radiation converted to millimeters of water per day (MJ).

This formula relies upon the same ET theories and interrelationships as the other formulas disclosed above. As described herein, such reliance causes the Hargreaves formula to possess the same shortcomings as the other ET formulas.

In view of the significant discrepancies between various ET equations, as noted, the question is, which, if any, of these equations is the most accurate ET, or are they all merely theoretical estimations? The herein proposed invention is not so much theoretical as a practical and user-friendly alternative approach to water conservation with greater potential to save real rather than theoretical water.

In an October 2005 Assembly bill 2717 task force meeting in Sacramento, Calif., the state Department of Water Resources (DWR) was asked for their definition of "Smart" controllers. The DWR described "Smart" in the same manner as the. Irrigation Association, the. Center for Irrigation Technology, and the EPA, in that a smart controller is capable of adjusting itself daily based upon the time of the year and the current environmental conditions and that smart technology is not limited to ET controllers. A number of irrigation controller manufacturers currently offer ET based controllers. Several of them obtain the environmental data to calculate ET from historical records, while others utilize adjacently located weather stations to obtain real-time data. Others receive such information from a network of existing weather stations by radio, satellite or pager means for a monthly fee. The Irrigation Association announced at their November 2005 conference SWAT meeting in Phoenix, Ariz. that the Center for Irrigation Technology is continuing to test all climatologically based water saving systems to include ET, ground moisture sensing, and other types of smart technology.

The following U.S. patents all disclose various methods by which an irrigation controller calculates or adjusts an irrigation schedule based upon historical, distal, or local ETo: U.S. Pat. Nos. 4,962,522; 5,097,861; 5,208,855; 5,479,339; 5,696,671; 6,298,285 and 6,314,340. All of these methods calculate ETo values or receive them from external sources, and use such values to adjust and regulate irrigation. Such external sources may be CIMIS ET databases, local sensors, cable lines or broadcast stations. Several of these methods also utilize other data, such as precipitation.

Unfortunately, methods incorporating ET formulas, and the installation, comprehension and programming of controllers utilizing such methods, including those cited in the referenced patents above, are far too complex for the average user to understand and implement. Such a conclusion was reached in a recent study of ET controllers by the Irvine Ranch Water District, entitled "Residential Weather Based Irrigation Scheduling Study." The study stated the following: "The water agency solution to date has been to conduct residential audits, leaving the homeowner with a suggested watering schedule, hoping it would then be followed. These programs have had limited effect and a short-term impact. A preferred solution would be to install irrigation controllers that automatically adjust watering times based on local weather conditions. Unfortunately, until now, these large landscape control systems have been far too complex and expensive for residential applications."

Such complexity is underscored by the one hundred forty-five principal symbols and acronyms identified by the USFAO for use and description of the factors and variables related to ET theory and its various formulas, covering such variables as: the capillary rise; the resistance correction factor; the soil heat capacity; the psychrometer coefficient; and the bulk stomatal resistance of a well-illuminated leaf. The sheer number of variables renders ET theory difficult to explain, understand and apply, especially for an unsophisticated consumer with little or no scientific or meteorological background. For example, the manual for one ET-based controller currently on the market comprises over one hundred fifty pages of instructions and explanations. Such unfamiliarity and complexity increase the margins of error already associated with the various ET formulas, further diminishing their effectiveness.

Water districts, irrigation consultants, manufacturers, the Irrigation Association, the Center for Irrigation Technology and other attendees at the EPA's Water Efficient Product Market Enhancement Program estimated that, due to the complexity, cost, impracticality of installation and difficulty in programming current irrigation controllers, less than one percent of all commercial and residential landscape irrigation systems currently and effectively utilize some form of the ET or moisture sensing method. Such scattered adoption exists despite over fifty years of ET research, and over thirty years of ground moisture sensing technology. The magnitude of such ineffectiveness is underscored by the fact that there are over two million new controllers installed annually in the United States alone, and over fifty million controllers in use today. Even if the ET or ground moisture sensing methods provided one hundred percent efficiency, which they do not, the limited adoption of these methods renders them an ineffective means of significant water conservation, since only one percent of the runoff and water waste would be prevented under perfectly-efficient conditions.

A second shortcoming of the ET method is its dependence upon numerous categories of local, real-time meteorological data. As indicated above, many variables must be measured in order to calculate ET. Data for each variable must be obtained by separate sensors, each one installed in a particular location. Such particularity requires an understanding of local environmental conditions and meteorology. Furthermore, accuracy requires that the data be received from local sensors. Given the numerous microclimates existing within any one geographical area, data received from remotely located sensors may be inaccurate. The data must also be received and processed in real-time, since average or historical ET data may be inaccurate during periods of unusual or excessive heat, cold, or rain, or other deviations from historical climate patterns. Any inaccurate data would result in even greater ET deviations and inefficient irrigation.

ET measuring devices are generally also expensive to install and maintain. Sensors or weather stations must be placed within each microclimate to measure the different variables utilized by the formula of choice. Each weather station may cost up to several thousand dollars. Furthermore, all of these sensors or stations must undergo regular inspection, maintenance and calibration to insure that they continue to provide accurate data. This further increases the actual cost of each station. The sensors and stations must also be powered in some manner—depending upon the particular geographic location, AC power may not be readily available. All of these considerations increase the cost of implementing an ET-based irrigation system to a prohibitive level, and limit the widespread adoption of this method. Finally, all of this assumes that the weather station or sensors is even installable in a particular area. Some areas, such as street medians or parks, are not suitable for weather station or sensor installation due to aesthetic reasons or the likelihood of vandalism.

Another shortcoming of ET-based controllers is that all of the ETo formulas (including the Hargreaves formula) are generally expressed in hundredths of an inch, or millimeters, of water per day. Thus, ETo must be converted to an actual irrigation time of minutes. Such a conversion is dependent upon the characteristics of the particular hydraulic system, such as the valve sizes, water flow rates, and sprinkler or drip irrigation precipitation rates. One conversion formula, proposed by the Austin (Texas) Lawn Sprinkler Association, calculates the sprinkler run time in minutes (T) as follows:

$$T = \frac{60 \times ETo \times Kc}{Pr \times Ea}$$

The variables within this equation represent the following:

ETo=reference evapotranspiration rate, in inches.
Kc=the percentage crop coefficient.
Pr=the sprinkler precipitation rate, in inches per hour.
Ea=the percentage application efficiency of the hydraulics system.

As an example of such complexity, the crop coefficient (Kc) is different for each crop or landscape plant or grass type. Determining the precipitation rate (Pr) requires knowledge of the hydraulic system specifications—the particular types of valves and sprinklers, the number of valves and sprinklers within the system, the water flow rate and operating pressure. Such information is not readily available to the average consumer. Instead, the consumer must expend additional time and money to retain an irrigation expert to configure and install the system.

Another ET-to-irrigation-time conversion method, the 'deficit irrigation practice,' was proposed by the IA Water Management Committee in Appendix G of its October 2002 article entitled "Turf and Landscape Irrigation Best Management Practices." This conversion method comprised ten separate formulas, and utilized a total of twenty-nine variables and constants, not including those utilized in calculating the ET value. Many of these variables represented concepts and relationships difficult for the average irrigation designer, much less a consumer, to understand, such as: the local landscape coefficient for the particular vegetation; available water depending upon the particular soil composition; allowable water depletion rate from the root zone; maximum percentage allowable depletion without plant stress; the water management factor necessary to overcome water management inefficiency; the whole day stress-based irrigation interval; water flow rates for the particular system; and, of course, ET.

Due to the urgency arising from severe national drought and environmental conditions, and the shortcomings of the various present technologies, the irrigation industry is currently researching alternative methods for water conservation and prevention of unattended runoff. The Center for Irrigation Technology in Fresno, Calif., recently renamed as the Irrigation Center for Water Technology (ICWT) along with other educational and research institutions and water conservation agencies, is conducting studies evaluating various water conservation methods. On the national level, the EPA is considering the introduction of a "WaterStar" irrigation efficiency rating program similar to the "EnergyStar" rating system currently in use for equipment energy efficiency. The purpose of such an irrigation efficiency rating program is to promote consumer awareness and compliance as an alternative to mandated water conservation measures which would severely and negatively impact the irrigation industry, landscape aesthetics and the ecology.

It is clear from the foregoing discussion that the irrigation water management industry, in view of a politically and economically sensitive, and urgent, water crisis, is pursuing highly scientific, mathematical and/or theoretical approaches for resolving the problems of wasted irrigation water and drought conditions. Unsurprisingly, such approaches have met with limited success. The EPA, United States Department of Energy (DOE), Bureau of Reclamation, ecologists, environmentalists, municipalities, water agencies, research institutions, irrigation consultants, and manufacturers, are all searching for new methods that provide practical (as opposed to theoretical) improved irrigation efficiency—methods that overcome the particular shortcomings of the prior art. The California Assembly bill 2717 task force established to propose new regulation concerning landscape irrigation has recommended that all irrigation controllers installed by the year 2010 be "smart". Their definition of a "smart" controller is not limited to ET controllers. A "smart" controller is one defined as capable of adjusting itself daily based upon local weather conditions and proven capable by means of third party testing (such as offered by the ICWT) to provide enough water for a healthy landscape by maintaining an adequate root zone water supply with minimal (if any) waste or runoff.

Landscape water conservation also provides additional benefits. As noted by the EPA in its "Water Efficient Landscaping" guidelines, landscape water conservation also results in "decreased energy use (and air pollution associated with its generation) because less pumping and treatment of water is required and reduced runoff of storm water and irrigation water that carries top soils, fertilizers, and pesticides into lakes, rivers, and streams, fewer yard trimmings, reduced landscaping labor and maintenance costs, and extended life for water resources infrastructures (e.g. reservoirs, treatment plants, groundwater aquifers), thus reduced taxpayer costs." Thus, there is an urgent need for irrigation systems that conserve water and energy, and minimize negative impact upon the environment, by automatically adjusting their schedules periodically in response to meteorological and seasonal changes.

The problem of irrigation mismanagement, and the main hurdle faced by these entities, can be simply summarized as follows: once a system is properly designed, most of the wasted landscape irrigation water and runoff is caused by not adjusting for daily, periodic, or seasonal changes. For example, in California, most homeowners and municipalities continue to irrigate their system in the fall based upon the summer schedule until the first rain storm of the year occurs followed by a sharp drop in temperature. If the summer schedule is assumed to be 100%, and November irrigation actually only requires, for example, about 20% of summer irrigation to satisfy the vegetation needs, this means that as much as 80% of the water is wasted in the fall. Such inaction is usually caused by the complexity and difficulty of determining the particular adjustment amounts and the significant inconvenience of daily adjustments.

As an alternative to costly and impractical to install weather stations, some manufacturers are offering an ET service that broadcasts the daily ET signal by means of a satellite or pager system. An example of this approach is the AccuWater system which takes weather data collected through a private network of weather stations and or sensors. Another example is the HydroPoint Weather TRAK that requires every controller to have a receiver that either receives ET that affects the controller irrigation programming, or one that receives separate weather sensor data that is then calculated locally into an ET value (such as provided by Irrisoft with its Weather Reach Receiver) that is again converted to a watering duration by the controller. A monthly service fee is charged for this service, which is objectionable to most residential users. A typical residential controller costs less than $100 retail. Users do not wish to pay a monthly fee ranging from $4-$12 a month for as long as they have the service. In addition, most of these methods operate by breaking the common to the valves as a means of altering the irrigation schedule. This approach of calculating an ET and breaking a common has several other problems:

1. The irrigation is either on or off, much like a rain switch breaking the common. It does not offer the gradual irrigation adjustment offered by the present invention, nor does breaking the common offer independent station scheduling changes.
2. It may shift the schedule into a day or time of day that is not desirable, such as gardening day or during a weekend backyard picnic, or during a "non permitted" irrigation time based upon local watering allowances.
3. The wireless receiver requires additional power for operation and is subject to malfunction or RF interference and the need for maintenance for another piece of equipment.
4. An override switch is required for either emergency watering, or system testing.

With all these considerations and ET related complexities, a simple, intuitive solution would be highly preferred over the existing highly theoretical and technical, but impractical, state of the art ET-based and ground moisture sensing control systems.

It is therefore desirable to provide a simple, user-intuitive, and therefore readily accepted water conservation approach, particularly for a clearly understood automated method of calculating and implementing irrigation schedules. It is further desirable to provide a method that does not necessarily rely upon ground or air moisture sensing means, weather stations, or ET (either directly, or as a basis for deriving the sprinkler operating times). It is further desirable to provide a method that minimizes the margins and sources of errors by minimizing the number of sensor inputs required by the variables in the formula. It is further desirable to provide a method that utilizes minimal local, real-time meteorological data that is not ET based. It is further desirable that such a method be cost-efficient, affordable, installable, and usable by a large number of people and entities within the irrigation industry with the widest range of applications possible. It is further desirable that such a method be understandable by the average consumer. It is further desirable that such a method be accomplished automatically, without requiring regular manual adjustments by the operator of the irrigation watering time settings or schedules.

SUMMARY OF THE INVENTION

The present invention provides simple and automated methods for water conservation and management, one which minimizes runoff, and is totally independent of ground moisture sensing, weather stations, ET, or complicated formulas for calculating irrigation durations or sprinkler operating times based upon ETo. Instead, the present invention relies almost exclusively upon the time of year, local real-time temperature data and its paticular geographic location, to calculate and adjust an irrigation schedule on a daily or periodic basis. Minimizing the number of variables in this manner renders the present invention easier and less expensive to install, operate and maintain, and therefore, much more appealing to the public.

These methods can be used with any irrigation controller system: AC, DC, battery, solar, water, wind, or ambient light powered, and with stand alone or central wired or wireless controllers, with or without remote programming, with wired or wireless sensors, or as an add-on module to existing controllers. Temperature budgeting offers "Smart Water" technology that can also be used in the form of a module mounted easily and inexpensively without a service fee at the valve(s) with independent valve operation from any existing controller.

The methods are based upon the following universally understood concepts:

1. More water is required to irrigate landscape or crops during periods of warmer temperatures.
2. Less water is required during periods of cooler temperatures.

3. Little or no water is required or desired below a certain temperature, or during certain times of the year.
4. No irrigation is required while it is raining, or for a period thereafter.

The methods and apparatus of the present invention may be provided in a commercially available device having the following components: a means for an operator to enter data into the controller, such as a keyboard, touch screen, dial, magnetic card readers, remote or wireless device (cell phone or pager); a microprocessor to compute and adjust the irrigation schedule according to the present invention, based upon internal and external data; one or more data storage means (which may or may not be integrated with the processor), such as random access or read-only memory chips, or hard drives, containing the present invention and zip code or latitude and extraterrestrial radiation lookup tables and other data used herein, and storing the preliminary and adjusted irrigation schedules; a power source, either alternating-current (AC), direct-current (DC), battery, solar, ambient light, water, or wind powered; at least one temperature sensor, which may be provided in a separate unit that is in communication with the microprocessor (e.g., through a physical hard-wired connection, a wireless connection or radio transmission), or may be a component built into the irrigation controller; and means for controlling or limiting the water used by an irrigation system, such as cutoff switches or adjustable valves. Additional optional features include at least one precipitation sensor, at least one relative humidity sensor, and a global positioning system (GPS). The precipitation and/or relative humidity sensor(s) may be provided in separate unit(s) that are incommunication with the microprocessor (e.g., through a physical hard-wired connection, a wireless connection or radio transmission), or they may be components built into the irrigation controller. It is to be appreciated that each of the sensors may constantly or periodically provide a signal or input of raw data to the controller that is read, processed and used in determining the water budget ratio that will be applied to the irrigation schedule without performing any calculation of ET. The GPS system may also be provided in a separate (optionally removable) unit, or it may be integrated with the controller unit as well.

One embodiment of an irrigation controller embodying the present invention is installed within a common polyvinyl-chloride (PVC) irrigation pipe. The pipe may be inserted into the ground so that it extends only slightly above the ground to offer improved wireless reception. This placement minimizes the profile of the controller, increasing the aesthetic appeal of the surrounding environment and reducing the likelihood of vandalism. The controller utilizes wireless communication means (such as radio or infrared), allowing the operator to program the apparatus remotely. A temperature sensor is installed within the pipe at a position that minimizes sun-loading effects. Such a location may be near or just below ground level, or on top of the pipe under a shaded and ventilated cover. An optional precipitation sensor, with or without a rain-catcher, may be mounted at the top end of the pipe to detect rainfall, or at another location in wired or wireless communication with the controller.

A preferred embodiment is battery-powered, using commercially available technology emphasizing energy conservation and the long-distance operation of irrigation valves. Significantly extended battery life, and the extended range of DC valve operations, such as those disclosed in this inventor's U.S. Pat. Nos. 5,914,847 and 6,351,366, allows the controller to be placed in remote areas, without the need for AC power or solar panels. Such battery power minimizes the dangers of power surges and outages, and improves electrical safety and aesthetic appeal. It also eliminates the installation and maintenance cost of power meters, and their unattractiveness in the landscaped area.

An alternative embodiment provides for the irrigation controller to be housed within a valve box, with externally mounted temperature and optional precipitation, humidity, wind, or rain sensors affixed upon the valve box or elsewhere, and provided in wired or wireless communication with the controller. The controller may be powered by using any one or more of the power sources described above, depending upon its particular placement relative to such available sources. This approach may be better suited for certain residential, commercial, and turf irrigation applications.

Another embodiment provides for the controller to be housed in its own enclosure that is provided in near proximity to an A/C power source, and to the switches or valves to be operated. The temperature sensor and optional precipitation/humidity sensors may be mounted on the enclosure, or provided nearby in wired or wireless communication with the controller. A typical application of this embodiment is a residential controller installed inside the garage. In this case, the temperature sensing probe can be routed out of the garage in the same manner as the valve wiring and exposed to the ambient temperature. A rain switch can also be mounted outside the garage such as on an eave.

In commercial use with AC power, the operator first attaches the irrigation controller to an existing irrigation system. This can be done at any time of the year, not merely during the summer months. He also installs the temperature sensor within the target geographical area, and initiates its communication with the controller. An optional readily available rain sensor and/or humidity sensor may also be installed, and placed in communication with the controller. Finally, an optional GPS system may also be installed and placed in communication with the controller.

With the most basic programming method, the operator initially programs the controller using either a data entry device at or on the controller or its enclosure, or using wireless or radio input that is received by the controller. The programming steps are as follows: the user first enters the current date and time (e.g., time-of-day, month, day, and year). The user then enters the expected summer high (referred to herein as the "stored" or "standard") temperature at the particular controller location. The user then provides the latitudinal location of the controller. The latitudinal location may be determined by the operator from information provided by various sources, such as online databases or a reference chart in the controller owner's manual. Alternatively, the latitudinal location may be determined by the controller itself when the operator enters the local zip code, the controller using an internal lookup table to match the zip code with an approximate latitude. An exemplary initial setup screen would thus have an appearance similar to the following:

| | |
|---|---|
| Current Time/Date: | 10:15 AM Feb. 15, 2004 |
| Expected Summer High Temperature: | 98° F. |
| Latitude of this Location: | 36 N |

As an alternative to entering the local latitude and average summer high temperature, and as the preferred embodiment, the end user may simply enter a local 5-digit zip code. In 1993, Oregon State University developed a Spatial Climate Analysis Study. The result was entitled the "PRISM" model (Parameter-elevation Regressions on Independent Slopes Model) which takes all the zip codes in the United States and reports 10, 20 and 30 year averages of various climatological data such as maximum, minimum and average temperatures, rainfall, etc. The study took 4 kilometer square areas of the United States, and using the closest weather stations, interpolated the meteorological parameters taking into account topography such as elevation and proximity to water bodies. This study and data is recognized by the USDA National Resources Conservation Service, the Forest Service, and the NOAA Office of Global Programs.

By entering a zip code into the controller, the latitude and average summer high temperature may be automatically determined using such stored historical data. This eliminates the need for the user to enter the local latitude and estimated summer high temperature manually, simplifying the programming procedure further. This approach still requires providing the controller with an initial (summer) irrigation schedule. An example programming screen for this approach appears as follows:

| | |
|---|---|
| Current time/date: | 10:15 AM Feb. 15, 2004 |
| Local zip code: | 93711 |

In another embodiment, a GPS system is provided either with the controller or in a separate, optionally removable unit. Upon power up, the GPS system determines the location (through satellite communication or the like), which is provided to the controller. Then, as with the zip codes discussed above, the latitude and/or average summer high temperature may be automatically determined from stored historical non ET based data using the position information from the GPS system, instead of user input. The user must still provide an initial irrigation schedule. In a preferred aspect of this embodiment, since the controller is not generally intended to be moved after it is deployed, the GPS system may be removed after the controller position is determined and downloaded, with the position information stored in non-volatile memory. Alternatively, the GPS system may be part of the deployed controller system, and remain with it.

As an alternative to the GPS method or zip code entry from which the controller internally determines the latitude and the average summer high temperature for that PRISM cell, that information or zip code could be inputted by the local irrigation distributor along with the date and the local time at or before the time of delivery of the unit. In this manner, the end user would only have to program the controller for its summer irrigation schedule and connect the temperature sensor and optional other sensors.

The controller requires a preliminary (preferably summer) irrigation schedule. This may be a default schedule, or an initial schedule provided by the operator. This preliminary schedule may be obtained from a system designer, consultant, equipment distributor or architect, any of whom may recommend an appropriate summer irrigation schedule based on the soil type, slope, variety of landscape vegetation, types of valves and sprinklers, and water available for that particular area.

The controller then automatically determines the extraterrestrial radiation factor (RA) for the standard date and location from a look-up table stored within the controller. The RA utilized by this invention must be distinguished from the solar radiation value (Rn or Rs) provided by weather stations and sensors, and utilized by ETo formulas. Specifically, RA is a function of the angle at which the sun strikes the earth at various times of the year at various latitudes, while solar radiation is a measure of the actual intensity of sunlight at a particular time.

The controller then automatically calculates the standard temperature budget factor (STBF) using the summer high temperature, its date and the latitude, and any number of relatively simple formulas utilizing the RA value for the high temperature date. Specifically, and as described in greater detail herein, one method of calculating the STBF is to multiply the high summer temperature (from a stored table, or provided by the operator) by an RA (the RA determined by the particular geographic location of the controller, and either the estimated date of the summer high temperature or the average summer RA values for the particular geographic location). The STBF is then stored within the controller and used for subsequent determinations of the water budget ratio (WBR), as described in greater detail herein.

The controller also obtains the actual high temperature and RA for the particular current period, the former from its temperature sensor and the latter from its internal look-up table. Such periodic data is used to calculate the periodic temperature budget factor (PTBF). The PTBF is calculated utilizing the same formula for calculating the STBF, but using currently available data.

In one aspect of the invention, the controller then computes the WBR by dividing the PTBF by the STBF. This ratio is then used to adjust the preliminary irrigation schedule for that particular period. In this aspect of the invention, preliminary irrigation schedule may be multiplied by the WBR to obtain the modified (actual) irrigation schedule. The present invention then irrigates the irrigation area pursuant to the modified irrigation schedule, as described in greater detail herein.

Because the present method relationally adjusts the irrigation schedule, it is suitable for nearly all conditions and locations. It inherently compensates for all of the characteristics and specifications of the existing irrigation system—unlike the prior art, it does not require multiple complicated formulas or variables. The method also inherently compensates for particular environmental conditions. For example, it may be applied to the "cycle and soak" method commonly utilized for sloped landscapes, since the present method increases or decreases the initial irrigation schedule for the sloped landscape based upon the WBR.

An alternative embodiment of an apparatus embodying the present invention provides a temperature budgeting module outside of a stand-alone irrigation controller. This module is placed along the output path of an existing irrigation controller, so that it intercepts and processes any signals (typically the 24 VAC) from the controller to the irrigation system. This module permits the operator to add the desired features described herein to any existing irrigation controller without replacing the old controller entirely.

Another alternative embodiment of an apparatus embodying the present invention permits the operator to install the present invention upon an existing irrigation controller by making the appropriate software changes to the instruction set of the controller, and by adding a temperature sensor to an available input port.

An alternative embodiment of the present invention does not require the operator to input the actual date of the expected high temperature. Instead, the present invention may assume that such date occurs during the summer months, and average the RAs for the summer months to obtain an average RA for the STBF calculation.

Another alternative embodiment of the present invention allows the operator to input the temperature, date and preliminary irrigation schedule for any time of the year. The present invention then determines the STBF from such data. The WBR remains accurate due to the ratio relationship between the PTBF and STBF, as described herein.

Another alternative embodiment of the present invention utilizes AC power instead of battery power. While the latter is the preferred embodiment herein because it is the most technically challenging due to its power availability limitations, residential applications constitute over half of all landscape irrigation controllers. Virtually all of these residential controllers are AC-powered. Such an alternative embodiment of the present invention may be installed anywhere upon. the residential property, such as within a garage. It may be operated by input means built into the controller, or by wireless transmission from a remote. The temperature and rain sensors are mounted outdoors to measure ambient temperature, at various locations (such as the eave of the garage). These sensors may be hardwired to the controller or in short-range wireless communication with the controller. The method of calculating the WBR, and the operation of the cutoff switches and valves, remain unchanged.

Optional procedures may also be incorporated into the present invention. For example, after entering the expected summer high temperature and latitude or the zip code, the operator may specify the minimum irrigation temperature. This insures that the irrigation schedule is not activated when the temperature is near or below a certain point, such as freezing temperature. Such minimum temperature requirement serves two primary purposes—first, to conserve water, and second, to protect the safety of vehicles and pedestrians traveling through the irrigation zone during freezing temperatures. A second option permits the operator to further adjust the irrigation schedule according to the particular circumstances and/or limitations, such as the water delivery method utilized by the irrigation system, the specifications of the system, or the type of plants being watered. This allows the operator to fine-tune the irrigation schedule based upon personal experience, observations or unusual field situations. A third option is to attach a commonly available precipitation sensor to the irrigation controller, either directly or indirectly as a separate unit in communication with the irrigation controller (e.g., through a physical hard-wired connection, a wireless connection or radio transmission) or as a component built into the irrigation controller, so that the controller may detect the occurrence of rainfall and suppress the irrigation schedule during the affected periods.

The particular effect of current or recent precipitation upon the irrigation schedule may be determined by the operator. For example, the operator may cause the present invention to suppress the irrigation schedule if precipitation occurred within the previous twenty-four hours, or only if precipitation is occurring at the particular moment of irrigation. It is to be appreciated that the precipitation sensor periodically or constantly provides a signal or input to the controller that is read, processed and used in determining the water budget ratio that will be applied to the irrigation schedule, and that the mere presence of such a signal alone is not sufficient to terminate any irrigation cycle. In some embodiments, the signal may only be provided once, or at periodic intervals, during which the controller reads and stores the data from the signal. Then, at a later time (such as just before an irrigation cycle is scheduled to commence), the controller processes the previously read and stored data to determine whether to shorten or skip the irrigation cycle. It is to be appreciated that at the time this processing is done, the signal may no longer be present.

In yet another embodiment, the previously disclosed controller housed inside a PVC pipe could be alternately mounted inside a valve box. A number of manufacturers offer valve box controllers in residential or commercial applications. These controllers are virtually all battery powered, as described by this inventor's U.S. Pat. No. 6,335,855 entitled "Battery powered programmable remote switch controller." Temperature budgeting could be incorporated into these controllers which can be programmed directly by removing the valve box cover and inputting the irrigation program by means of data entry switches, or by downloading the program by using a portable programming unit which is then plugged into to the valve box controller. These valve box controllers can also be programmed by a wireless hand held programmer. These controllers would incorporate the same geo-environmental (non ET based) data as previously described (summer average high temperature and latitude or zip code) which can be obtained from the PRISM model and calculate the water budget ratio with the daily high temperature data from a wired or wireless temperature sensor. In this and other embodiments, a central temperature sensor or other regional broadcast of temperature could be used to provide the temperature and rain information to a large number of valve box controllers over a wide area with common latitude and average high temperature.

In cases where a central broadcasting temperature/rain sensor system is not available or feasible, or it is not practical to mount a temperature sensor near the valve box above the ground, an alternative approach provides the battery powered valve box controller with its zip code, which determines the STBF. With the PRISM data, it is feasible to provide the valve box controller with its daily or periodic historical RA and average temperatures, providing the means for an approximate WBR calculation. While this is not a real time WBR calculation, it is an improvement over no periodic water budget adjustment, therefore saving the labor of frequent water budget adjustments during the course of the year, resulting in some water conservation.

In another embodiment of the present invention, the controller (AC or DC, solar, inside valve box, etc.) does not itself calculate the WBR. A centrally located processor with rain and temperature sensors is pre-programmed with the 5-digit zip code which determines the average summer high temperature and latitude for that and other environmentally similar zip codes. This apparatus can be called a CBM (Central Broadcast Module). While measuring the daily temperature and monitoring for rain with any one of a variety of commonly available rain switches or rain tipping buckets, the centrally located processor calculates the WBR and transmits the WBR percentage to all controllers within their range in a wired or wireless configuration. The CBM does not transmit any weather sensor data to the remote controllers. Instead, this embodiment forwards by wired or wireless means the calculated WBR, much like ET data is currently transmitted to irrigation controllers. The basic water budget factor is the WBR=PTBF/STBF, as discussed previously. In a wireless configuration incorporating a rain switch or some other sensor, this equation can be further refined as follows: $WBR_M = STBR/PTBF \times ESF$ where $WBR_M$ is the modified water budget ratio, and ESF is the Environmental Sensor Factor, which can consist of a rain, wind, humidity, or solar sensor, or combinations thereof.

As an example, when the rain switch is closed (when it is not raining), ESF=1, not affecting the WBR. In the case of rain, this factor can be a small number (less than 1) decreasing the WBR to a percentage at or near 0. The same method is used to restrict or eliminate irrigation during cold temperatures if the temperature is below a set point. In this embodiment, the WBR is calculated remotely outside the controller and transmitted to the controller(s) within its hard-wired or wireless proximity. This embodiment is suitable for battery powered valve box controllers, commercial AC or DC powered controllers, or central control systems in larger projects such as parks, schools, golf courses, and large apartment complexes. See FIG. 11.

There are a number of advantages to this remote approach to transmitting the WBR using a CBM:
1. The individual controllers do not have to be programmed individually by zip codes. Even the current time and date can be transmitted to the remote field or slave controllers from the central processor.
2. There are no significant data storage requirements for the remote controllers. All the zip code information and look up tables are eliminated as this data is incorporated into the CBM. The remote controllers merely execute the water budget ratio prescribed by the central processor suitable for their local area.
3. This simplifies the modifications to the software in each of the remote controllers. Since most irrigation controllers already incorporate a method of changing the watering times by means of a manually-entered universal water budgeting software, it would be a simple conversion to automate this budgeting method with the temperature budgeting WBR approach.

In yet another embodiment that demonstrates the extensive flexibility of the temperature budgeting method of the present invention, a temperature budgeting module (TBM) may be provided between any existing irrigation controller's output and its cutoff switches (valves).

At this point, a distinction is made between the CBM (central broadcasting module) and the TBM (temperature budgeting module). Both the CBM and the TBM calculate a daily watering budget by comparing the historical average summer high temperature at that location and the daily high temperature readings and the time of the year.

The CBM provides a percentage (water budget ratio—WBR) of summer irrigation to one or more irrigation controllers by wired or wireless means. Each controller uses that WBR in adjusting the output durations which are determined by the controller(s). This method would normally require hardware and software changes within the controller to accept and process the WBR. The advantage is that because the zip code data is stored in the CBM, a minimal amount of memory is required within each controller.

In contrast, the TBM requires no controller hardware or software changes. It is compatible with any 24 VAC output controller (about 90% of all controllers available). With minimal adaptations, it is also compatible with DC controllers. It affects valve operation directly either at the outputs of an irrigation controller, as shown in FIG. 14, or at the valves in the field as shown in FIG. 14E and described below in example 4. Because the controllers require no changes, these methods are compatible with all AC powered controllers. A small inexpensive module is placed at each valve or set of valves, and can modify valve operating time without having to change or modify existing controllers. It is estimated that scores of millions of controllers are in current use and operating about 100 million valves in the U.S. The TBM embodiment allows every irrigation system valve and controller to be temperature budgeted without changing controllers, valves, or the wiring from the controller to the valves.

The TBM can be programmed with its zip code by any number of methods such as being pre-programmed at the factory based upon its sales destination, programmed upon receipt at the retail or wholesale location, or field programmed by means of a small display and/or adjusting switches. By way of example only, and without limiting the foregoing, one method of programming the zip code is with a dip switch labeled numerically from 0 to 9. If the zip code is, for example, 93711, the #9 dip switch is flipped on for one second and turned off, then the #3 dip switch turned on for one second and turned off, then the #7, then the #1, then #1 again. Or, five dip switches may be provided, with each switch being set to correspond to one of the digits of the 5-digit zip code. Using dip switches eliminates the need for a display or entry buttons, thereby reducing cost and size, and improving reliability. Other simple non-display data inputs are also contemplated in this embodiment.

In a typical existing residential application, the homeowner may use an existing controller mounted in the garage. The user would normally already know the summer irrigation schedule based upon the original system design, or by experience. A temperature sensor with or without a rain switch is mounted outside the garage and the wires are routed to the TBM. The power to the TBM may be derived from the commonly existing 24 VAC transformer powering the existing controller, or the TBM may be self-battery powered. A typical residential irrigation system may have from 2 to 8 valves. The output from the controller to each valve is first wired to the input of the TBM (along with the wiring common). The output of the TBM is wired to the existing wires attached to the valves. Once these connections are made, the user programs the controller with its summer irrigation schedule during any time of the year and proceeds to operate the system as if it were summer. If no watering is desired at the time of the TBM setup, the common to the valves from the TBM could be disconnected so no actual irrigation occurs.

The homeowner may then activate the summer watering program by either programming an automatic start or performing a manually initiated semi-automatic cycle. The activated stations are each typically powered with 24 VAC, which is intercepted by the TBM. When the stations go off after the appropriate summer irrigation watering durations, the TBM microprocessor remembers the operating time of each station. Once every utilized station has been activated with its summer irrigation duration, the TBM stores that information within its memory. After this initial "training" or "learning" session, the common to the valves is reconnected for normal operation. The TBM uses the zip code information as discussed previously to calculate the STBF for that specific location. It then uses the temperature reading from its externally mounted temperature sensor to calculate its PTBF from which the WBR is calculated.

Each day, a new WBR is calculated by the TBM. Upon the next start of an irrigation cycle, as each station comes on, the TBM recognizes which station is activated from the output which is energized. Once the percentage of the summer schedule is reached, the TBM turns off the output prior to the end of its summer run time. The run time for each successive station is adjusted similarly. By this method, any existing controller, (residential or commercial) can be adapted to save irrigation water by adjustment of its output running time. Since it is recommended that deficit irrigation is preferred to over-irrigating, it is not likely that much more than 100% of summer irrigation would be required or necessary for the healthy growth of landscape vegetation.

The methods of the present invention are preferred over simply cutting off the common to the valves (which forces either full irrigation or no irrigation) because individual station run times can be independently adjusted with the WBR. Of course, if a rain switch is used, it can terminate the irrigation altogether with its signal to the TBM or the controller. An override method may also be supplied to the TBM which would allow manual operation of valves for maintenance purposes without disrupting the previously set irrigation time(s). This override can be in the form of a pushbutton or other switch which directs the TBM to ignore its WBR for that day or for some other suitable period of time.

No time of day is required to be programmed within the TBM because it is only looking for a 24 VAC signal from the controller outputs. Only the date and month is needed for the WBR calculation, and these can be pre-set at the factory. It does not matter where the TBM is located since a time shift of a few hours does not affect the WBR calculation which is based on the day of the month. See FIG. 14 for a typical TBM installation. The signal from the temperature sensor to the TBM can be wired or wireless. The TBM itself is not an irrigation controller but a water budget calculator and proportional valve activator. See example 4 below for a discussion of a TBM mounted at a valve.

It is therefore an objective of the present invention to provide simple methods for irrigation water conservation, particularly methods that are naturally intuitive such that it may be used by a wide variety of people or entities in different circumstances.

It is another objective of the present invention to provide methods for conserving water by automatically adjusting irrigation schedules in response to varying climatic conditions.

It is another objective of the present invention to provide methods that utilize greatly simplified local, real-time meteorological data to calculate and maintain the irrigation schedule.

It is another objective of the present invention to provide methods that minimize the margins and sources of error within the automatically and climatically adjusted irrigation schedules by limiting the number of variables and relationships necessary to calculate and maintain the schedules.

It is another objective of the present invention to provide methods that may be embodied into or used with any irrigation controller that is inexpensive to manufacture, install, operate and maintain.

It is another objective of the present invention to provide a practical water conservation means that can potentially save more water than theoretical ET methods because of its comparative cost and simplicity.

It is another objective of the present invention to provide irrigation controllers that are capable of adjusting existing irrigation schedules according to the geographic location of the controller and a recent temperature reading, without using ET.

It is another objective of the present invention to provide add on modules that may be used in conjunction with irrigation controllers to adjust the controller's irrigation schedules according to the geographic location of the module and a recent temperature reading, without using ET.

It is another objective of the present invention to provide a central. processor that calculates an adjustment to be made to irrigation schedules and provides that adjustment by wired or wireless means to receivers which use the adjustment to modify the irrigation schedules of the controllers they are associated with.

Additional objects of the present invention shall be apparent from the detailed description and claims herein.

BRIEF DESCRIPTION OF THE DRAWINGS

FIG. 6 is a table of extra terrestrial radiation values at various latitudes.

FIGS. 9 and 10 are reports from the Center for Irrigation Technology regarding results from a test of the present invention in September and October, 2005, based upon a test protocol developed in association with the Irrigation Association, the EPA, and various water purveyors and agencies.

DETAILED DESCRIPTION

Figure 1:
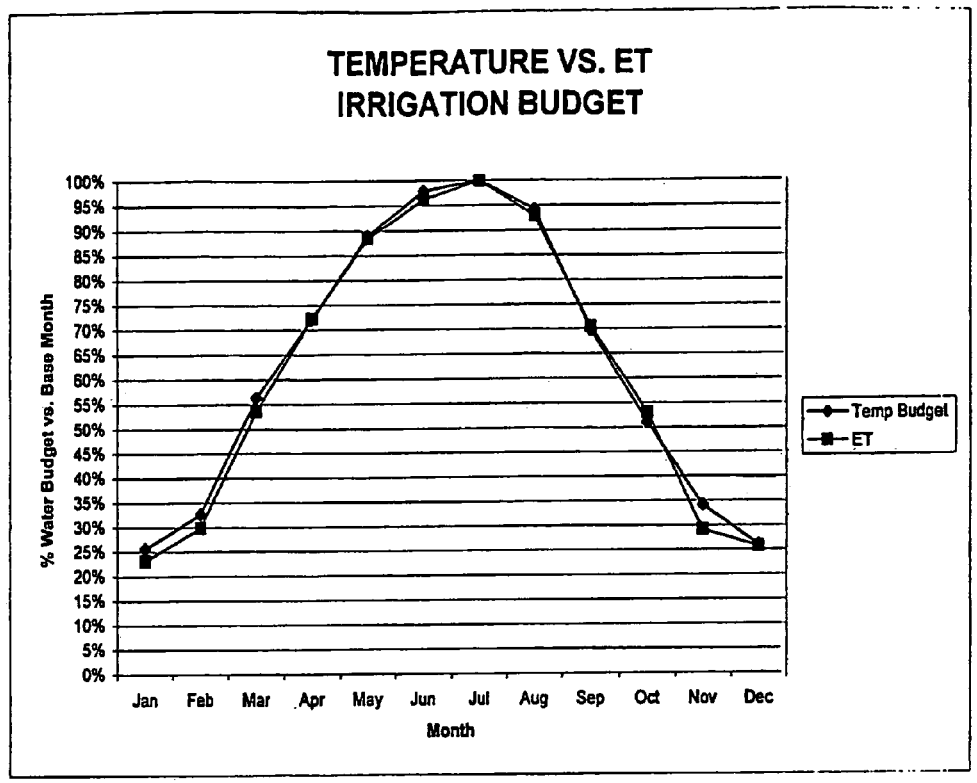
FIG. 1 is a comparison of evapotranspiration and temperature budget values for certain geographical areas of California over a five year period, beginning in 1997.

FIG. 1 compares the monthly ET values obtained using the Penman-Monteith formula (currently favored by the USFAO and CIMIS) with the ratios obtained utilizing the formula of the preferred embodiment described herein. Such comparison was made over a period of five years at twenty-five environmentally-diverse locations within the State of California. Both formulas used the same CIMIS data. For the Penman-Monteith formula, the published historical monthly ETo was divided by the historical summer ETo. The monthly temperature budget factors obtained by the present invention were similarly divided by the summer temperature factor. The ETo ratio is then compared to the WBR for relative accuracy. As indicated by FIG. 1, the values obtained using the formula herein closely approximate the Penman-Monteith, generally more so than the other ET formulas. This indicates that the present invention is superior to the other ET formulas, since a simple to understand method that is ninety-five percent as accurate as the current accepted 'standard' will save much more water than a more complicated method that is less accurate, and not as easily understood or utilized.

Furthermore, the present invention is advantageous over the Penman-Monteith, or any other ET formula, in that it achieves equivalent irrigation without relying upon the numerous variables and relationships of ET theory, or a subsequent calculation of irrigation time settings. Instead, the present invention utilizes only two variables—ambient temperature and the extraterrestrial radiation factor. Given this relative simplicity, and its intuitive approach, the present invention is much more likely to be adopted by the general public.

Another advantage of the present invention over the Penman-Monteith formula, or any other ET formula, is in terms of hardware costs. Specifically, in one alternative embodiment, only a temperature sensor is required—the existing irrigation controller, assuming that it satisfies certain minimum system requirements (such as the availability of an input port for the temperature sensor, sufficient memory to store the RA lookup table, and the ability to receive the software instructions for the present invention), may be used. This controller may be AC, DC, solar, or battery-powered.

Figure 2:
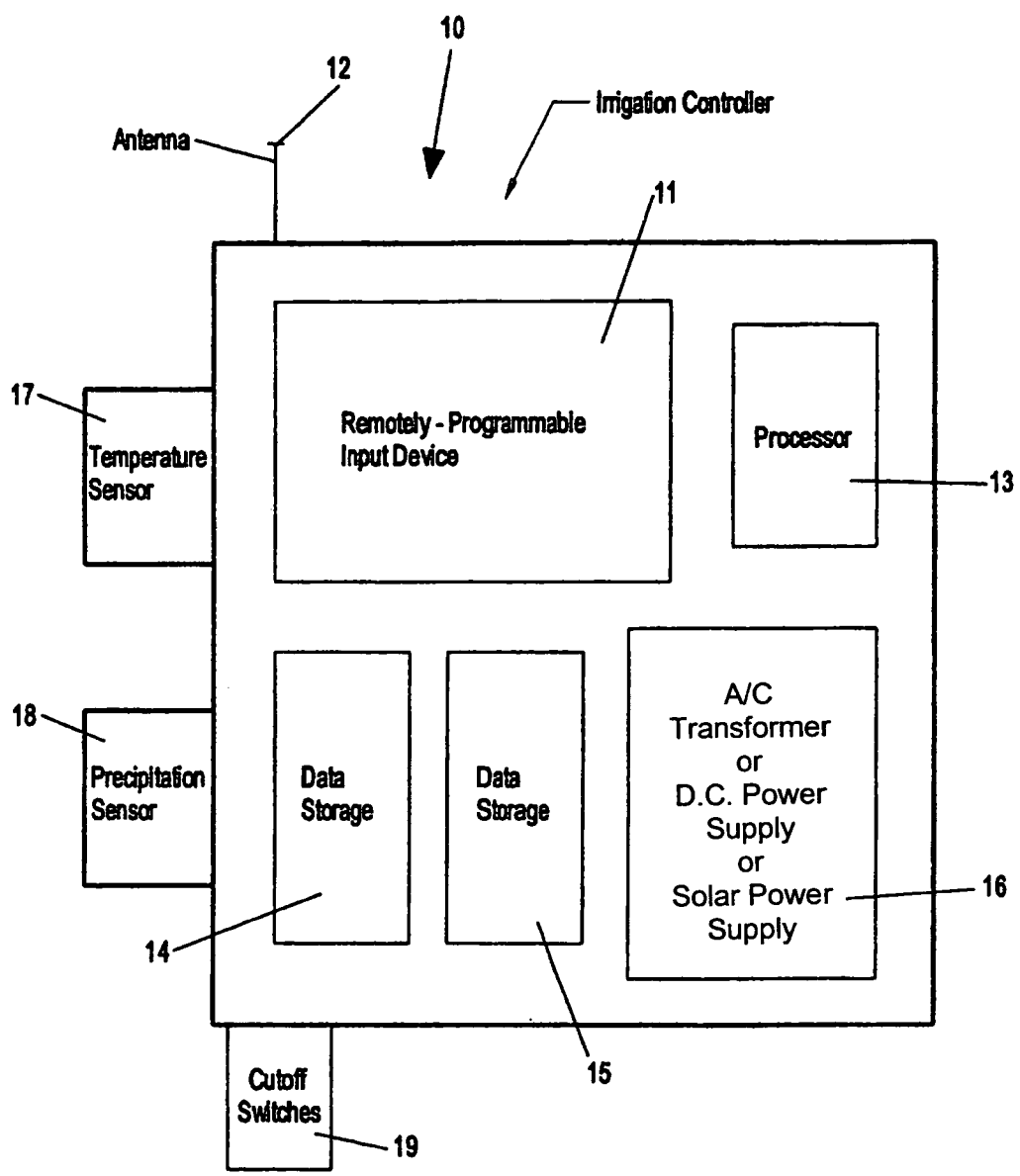
FIG. 2 is a block diagram of an irrigation controller embodying the present invention.

FIG. 2 depicts an irrigation controller 10 embodying the present invention. Such controller comprises the following components: a remotely-programmable input device 11 for entering data into the controller; an optional antenna 12 for receiving data from the operator via wireless means; a microprocessor 13; a first data storage means 14, such as a hard drive, containing a zip code/latitude lookup table formatted in a conventional manner, an extraterrestrial radiation lookup table formatted in a conventional manner, and the formula of the present invention, all for computing and adjusting the irrigation schedule based upon the data received; a second data storage means 15, such as a hard drive, for storing and maintaining the irrigation schedule information and data received by the controller; a battery, solar panel, or AC power supply, such as a transformer, 16; a temperature sensor 17 built into the irrigation controller or externally mounted in communication with the controller; an optional precipitation sensor 18, also built into the irrigation controller or externally mounted in communication with the controller; and one or more cutoff switches 19 for controlling water output from the irrigation system. It is to be appreciated that the first and second storage devices 14 and 15 may be integrated into a single storage device, and that either this single storage device or either of storage devices 14, 15 may be made part of the processor 13—potentially eliminating the separate storage devices 14 and 15 altogether. An optional GPS (Global Positioning System) receiver 29 may also be attached to controller 10.

Figure 3:
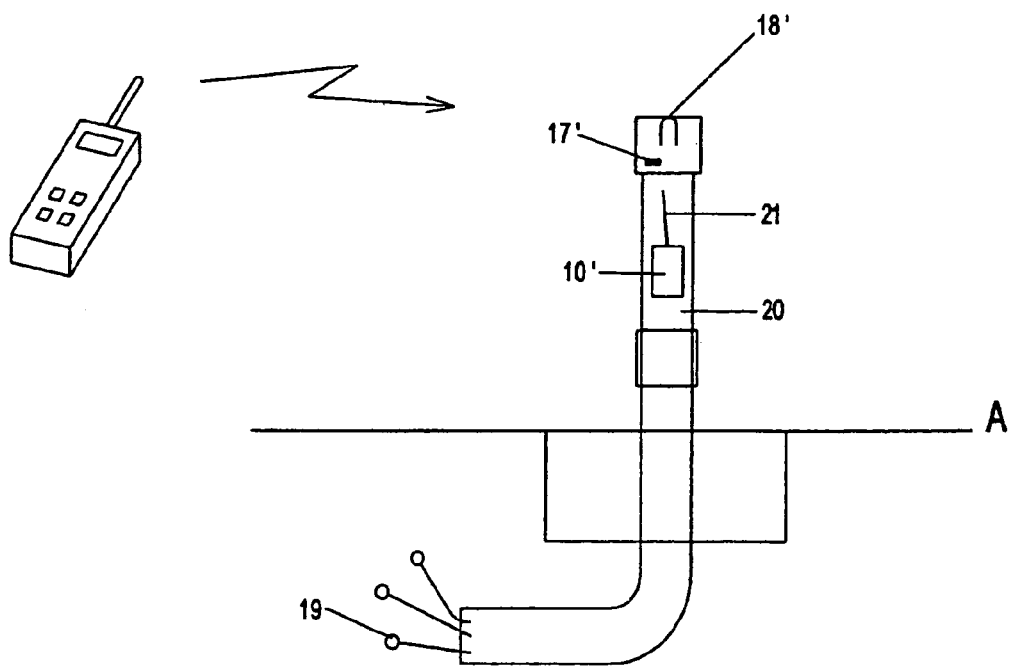
FIG. 3 is an environmental view of an alternative housing for the irrigation controller embodying the present invention.

FIG. 3 depicts an alternative housing for the irrigation controller 10' of the present invention. Here, it can be seen that the main body of the irrigation controller 10' (comprising the remotely-programmable input device 11, antenna 12, microprocessor 13, first 14 and second 15 data storage devices, and battery 16, none of which are depicted in this particular figure) is placed above ground level A. The temperature sensor 17' and optional precipitation sensor 18' may be incorporated with controller 10' and mounted, for example on top of the pipe as shown. Instead, these sensors are mounted above ground level A, and in communication with the irrigation controller 10' by wired means. The controller housing 20 (which may be a common PVC pipe) encloses and protects the controller 10' from the environment. The wires from the controller 10' to the cutoff switches (valves) 19 extend out of the housing 20 to the valves located in the field. It is to be understood that communications between sensors 17', 18' and the controller 10' may also be accomplished using wireless means by adding an antenna 21 to the sensors 17', 18' and the controller body 10', and placing the sensors in wireless communication with the irrigation controller 10'.

Figure 4:
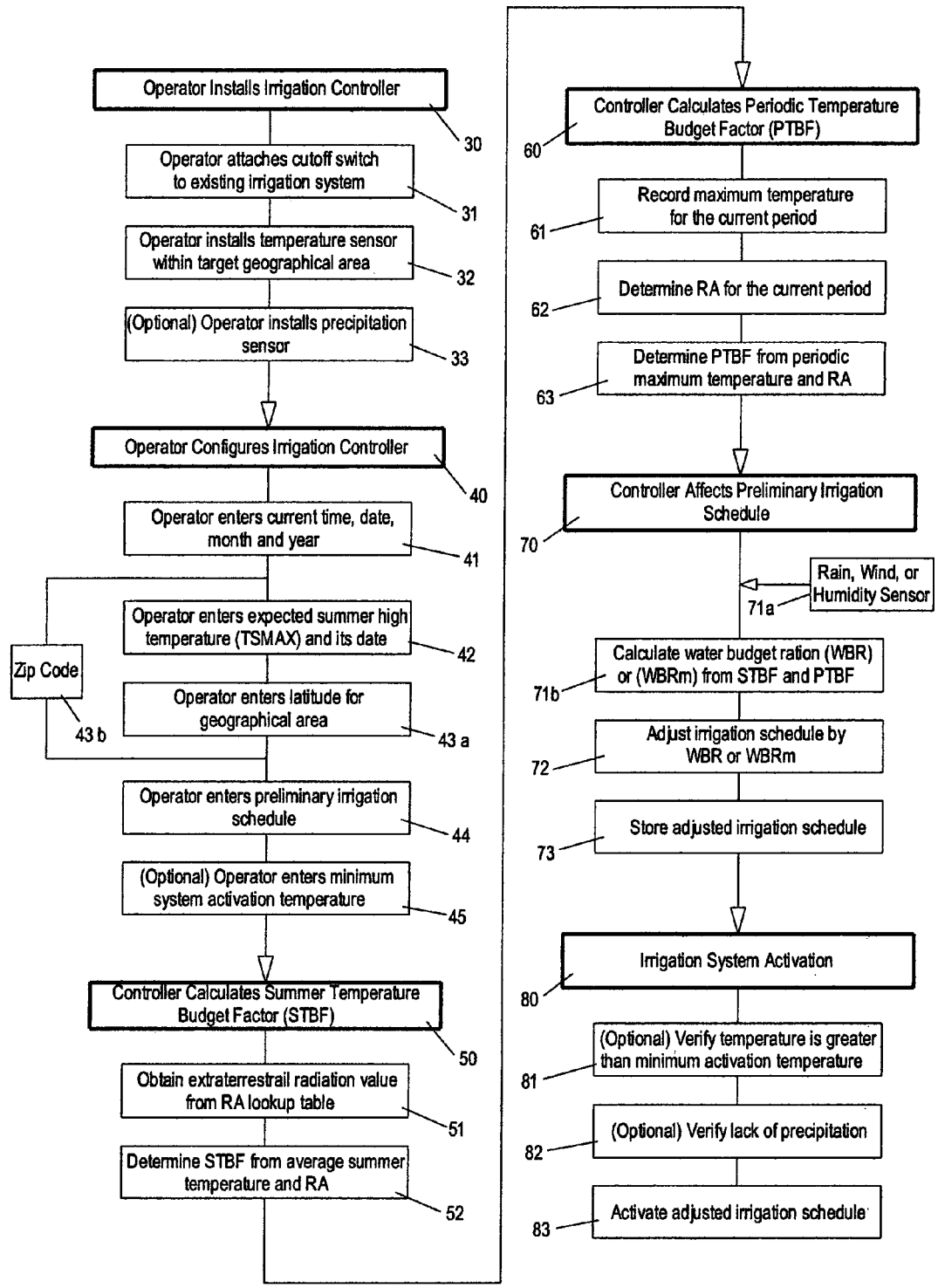
FIG. 4 is an exemplary flowchart depicting the complete and comprehensive steps of the present invention, including those steps performed manually by the operator.

FIG. 4 illustrates an exemplary method of the present invention comprising the following steps: first, the operator installs the irrigation controller 10 (step 30) by attaching one or more cutoff switches 19 to an existing irrigation system (step 31) and installing temperature sensor 17 within the target geographical area (step 32). The optional precipitation sensor 18 may also be installed within the target geographical area (step 33). The two sensors are then placed in communication with the irrigation controller.

The operator then, configures the irrigation controller (step 40). In one embodiment, the operator enters the current time (e.g., time-of-day, and/or month, and/or day and/or year) (step 41). The operator also enters the expected maximum summer temperature (TSMAX) and may enter the date of such temperature (step 42). The operator then provides the latitude for the geographical area (step 43a), if known. If the latitude is unknown, the operator may instead enter the zip code (step 43b) or some other geographical information (e.g., city, county, state, country, etc.) which the microprocessor 13 may use to obtain the latitude for the location from an appropriate internal lookup table. The user input may be made by means of a cellular telephone or pager. Alternatively, an optional GPS system could provide the controller location (zip code), and with that information the controller can automatically determine both the latitude and/or the average summer high temperature for the location. The operator also enters a preliminary (summer) irrigation schedule having one or more run times (step 44). The operator may also enter the minimum system activation temperature (step 45). All of this information may be stored within the first or second data storage means 14, 15, or in the processor itself.

In alternative embodiments, it is possible that little or no user input may be required. For example, in some embodiments, the processor may include an internal clock which already has the current date and time available, so no user input of this data may be required. In some embodiments, a default irrigation schedule may already be provided, so no user input of this information may be required. In some embodiments, a GPS system may be provided so that the user is not required to input any latitudinal information or zip code. Instead, the GPS system automatically determines the latitude and provides that information to the processor. In some embodiments, an internal table of average high temperatures according to general location may be provided, so no user input of this data may be required. It is to be appreciated that the scope of the invention includes any combination of user input and/or automatic determination of the following data items: (a) date/time, (b) irrigation schedule, (c) latitude or zip code, (d) expected high temperature and date. In a basic example, instead of entering the local latitude and expected summer average high temperature, merely entering the zip code would perform this function.

The microprocessor 13 then calculates the standard temperature budget factor (STBF) using the $T_{SMAX}$ and extraterrestrial radiation (RAs) (step 50). The RAs value is obtained from the extraterrestrial radiation lookup table within one of the data storage means 14 or 15 (or processor itself) (step 51), based upon the latitude of the location and the estimated date of the expected maximum temperature. If the operator did not provide a particular date for the expected maximum summer temperature, an embodiment of the present invention will generate a RAs value by averaging the RA values for the summer months (which may be November-January in the Southern Hemisphere). The STBF is then determined using the following formula: (step 52)

$$STBF = T_{SMAX} \times RAs$$

Using a summer RA factor is preferred because it is relatively constant throughout the summer months (June, July, and August, in the northern hemisphere), and those are the months that would typically require the highest amounts of irrigation. However, it is to be understood that the present invention is not limited solely to those particular RA values, and that the RA for any month may be used. In particular, other embodiments of the invention may allow for use of an average high temperature over a period of time (e.g., annual, bi-annual, quarterly, monthly, weekly, etc.) from which a corresponding RAs value is determined and used in the formula.

Another embodiment of the present invention would permit the operator to input a preliminary irrigation schedule and temperature for any time of the year, followed by the particular date such information is applicable. The date is then used by the controller 10 to determine the applicable RA. Such value is likewise accurate when used with the ratio method of the present invention.

As the formula demonstrates, the maximum (standard) temperature ($T_{SMAX}$) and extraterrestrial radiation (RAs) are the only factors required by the present invention to determine STBF. The $T_{SMAX}$ directly affects the plants' water requirements. The RAs is important because evaporation is also affected by the angle at which the rays of the sun strike the Earth; such angles vary depending upon the latitude and the time of year.

The controller of the present invention then calculates the periodic temperature budget factor (PTBF) (step 60). Using temperature sensor 17, the controller 10 records the maximum temperature ($T_{PMAX}$) for a particular predefined period (step 61). These temperatures are recorded by temperature sensor 17 on a periodic basis (e.g., hourly, daily, etc.), and stored within one of the data storage devices 14, 15 (or processor itself) until the end of the period. At the end of the predefined period, the microprocessor 13 calculates the PTBF using the maximum temperature ($T_{PMAX}$) for the period, and the current/present extraterrestrial radiation ($RA_P$) for the same period. The $RA_P$ factor can be obtained or extrapolated from the chart (based upon the particular day, week, or month, as provided by the time-keeping function of the CPU) (step 62). For a subsequent period, the recorded high temperature for the previous period is replaced with the latest measured high temperature. If this is done on a daily basis, the previous high temperature is replaced with highest temperature recorded during the past 24 hours. To conserve controller memory, the $RA_P$ chart could be stored monthly in increments of two degrees of latitude, as depicted in FIG. 6. The microprocessor 13 could then determine the PTBF, as follows: (step 63)

$$PTBF = T_{PMAX} \times RA_P$$

Once the PTBF is calculated, the microprocessor 13 may then affect the preliminary irrigation schedule (step 70), specifically by calculating the water budget ratio (WBR) as follows (step 71):

$$WBR = \frac{PTBF}{STBF}$$

A WBR value of one (1) indicates that the periodic TBF equals the summer TBF, in other words, that the irrigation needs for that particular period are satisfied by the initial summer-based irrigation schedule. Thus, no automated changes to the initial irrigation schedule would be needed for that particular period. A WBR value of greater than one would indicate that the PTBF was higher than the STBF, such that the irrigation needs for that particular period are greater than the irrigation needs for an average summer day. This would cause the controller to increase the irrigation schedule for the following period by a corresponding amount. A WBR value, less than 1, which would be the case most of the time that is not during the summer, indicates that less irrigation is needed than the average summer day, causing a decrease in the irrigation schedule for the following period.

The microprocessor 13 then multiplies the preliminary irrigation schedule by the WBR value (step 72). This causes the irrigation schedule adjustment to be determined by the ratio of the two temperature and RA values, ensuring that the area does not receive too little or too much water. The adjusted irrigation schedule is then stored upon the second data storage device 15, to be utilized for the following period (step 73).

When the irrigation schedule calls for water (step 80), the irrigation controller 10 first verifies the temperature (step 81), using temperature sensor 17, and if provided, the precipitation, using optional precipitation sensor 18 (step 82). If the current temperature is greater than the previously specified minimum system activation temperature, and there is no recent or current precipitation (as previously defined by the operator), the controller 10 activates (step 83) the irrigation system according to the adjusted schedule. If either of those conditions fails, the irrigation system is not activated. This prevents activation of the irrigation system on very cold or rainy days. Whether or not the irrigation system is activated, the controller 10 also continues recording (step 61) the $T_{PMAX}$ values for subsequent PTBF calculation and schedule modification.

This method for adjusting the irrigation schedule may be used year-round, and at any geographic location. For example, the winter PTBF will typically be much lower than the STBF, resulting in a much lower WBR value. This in turn significantly decreases the irrigation duration, which is consistent with the average consumer's understanding that irrigation is not as necessary during the winter months. When the operator inputs a minimum temperature and/or utilizes the precipitation sensor, the present invention is able to significantly reduce or completely cease irrigation during unnecessary periods. In a typically wired installation from the temperature sensor and/or the rain sensor to the controller, the present invention is able to completely cease irrigation during unnecessary periods.

When optional rain, wind, or humidity sensors are used, their sensor input(s) can affect the WBR calculation (step 71a) by adding another factor to the WBR calculation: The modified WBR would be the $WBR_M$=WBR×ESF (External Sensor Factor). For example, if a rain switch is used, but insufficient rain has occurred to activate the rain switch or tipping rain bucket, the WBR would be unchanged: WBR=$WBR_M$ since an inactive rain or wind sensor ESF would be 1. If the rain is sufficient, or the wind exceeds a certain speed, etc., the ESF could be a very low number such as a 0.01 to effectively minimize, terminate, or inhibit the irrigation cycle.

It is important to note that the present invention does not store, receive, or calculate ET. ET is a calculated theoretical measure of how much water is needed to satisfy the landscape (or agricultural) vegetation in inches or millimeters of water. In addition, ET methods typically alter the irrigation schedule, while temperature budgeting only changes the percentage of irrigation time on a daily basis. Changes in irrigation days or start times are not consistent with communities watering rules such as watering permitted only on certain days of the week or at only certain times of day. In addition, when the ET-based controllers change watering days and start times, the end user may not realize whether or not his controller is working properly until significant damage is done to his landscape. This is because the user usually would know when his irrigation should occur. This is not possible because the watering days and start times may have been changed by the ET controller. This leads to further apprehension by the user, lessening the likelihood of the use of ET based systems. The present temperature budgeting merely increases or decreases the station-run times without changing the watering days or start times. Of course, as an option, a rain switch can postpone one or more irrigation cycles during rainy periods. In addition, a minimum irrigation temperature can be set below which irrigation is also not started or is interrupted, such as during the winter or at temperatures near freezing for concerns over safety for icing due to overspray onto sidewalks, driveways, or roadways.

It is to be appreciated that the previous discussion of one embodiment of the method of the present invention is for illustrative purposes only, and is not meant to limit the claims herein, nor the numerous alternative embodiments that are also available.

Figure 5:
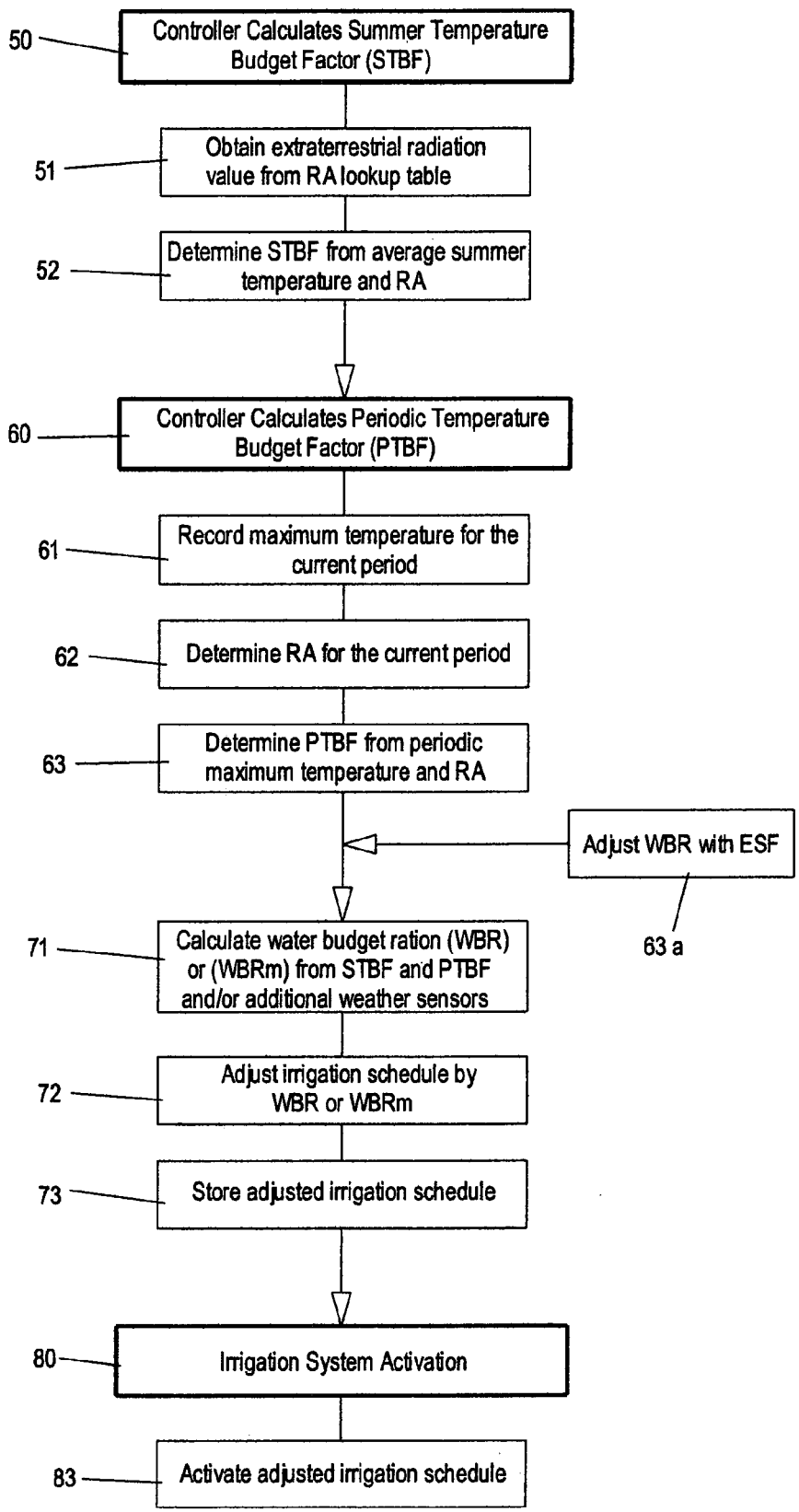
FIG. 5 is an exemplary flowchart depicting the basic steps of the present invention, particularly only those steps performed automatically by the controller embodying the present invention.

FIG. 5 depicts the portion of the method of the present invention performed by the controller itself. From this depiction, it is apparent that the present invention is able to automatically calculate and adjust the irrigation schedule in a simple manner, without resorting to the numerous and complex data and calculations found in the various ETo methods. Note that step 63a is an optional external input that can, under certain circumstances, affect the WBR with the ESF factor.

FIG. 6 is a published table of extra terrestrial radiation values at various latitudes. As indicated herein, this table is stored within the one of the data storage devices 14, 15 of an apparatus embodying the present invention, or within microprocessor 13.

Figure 7:
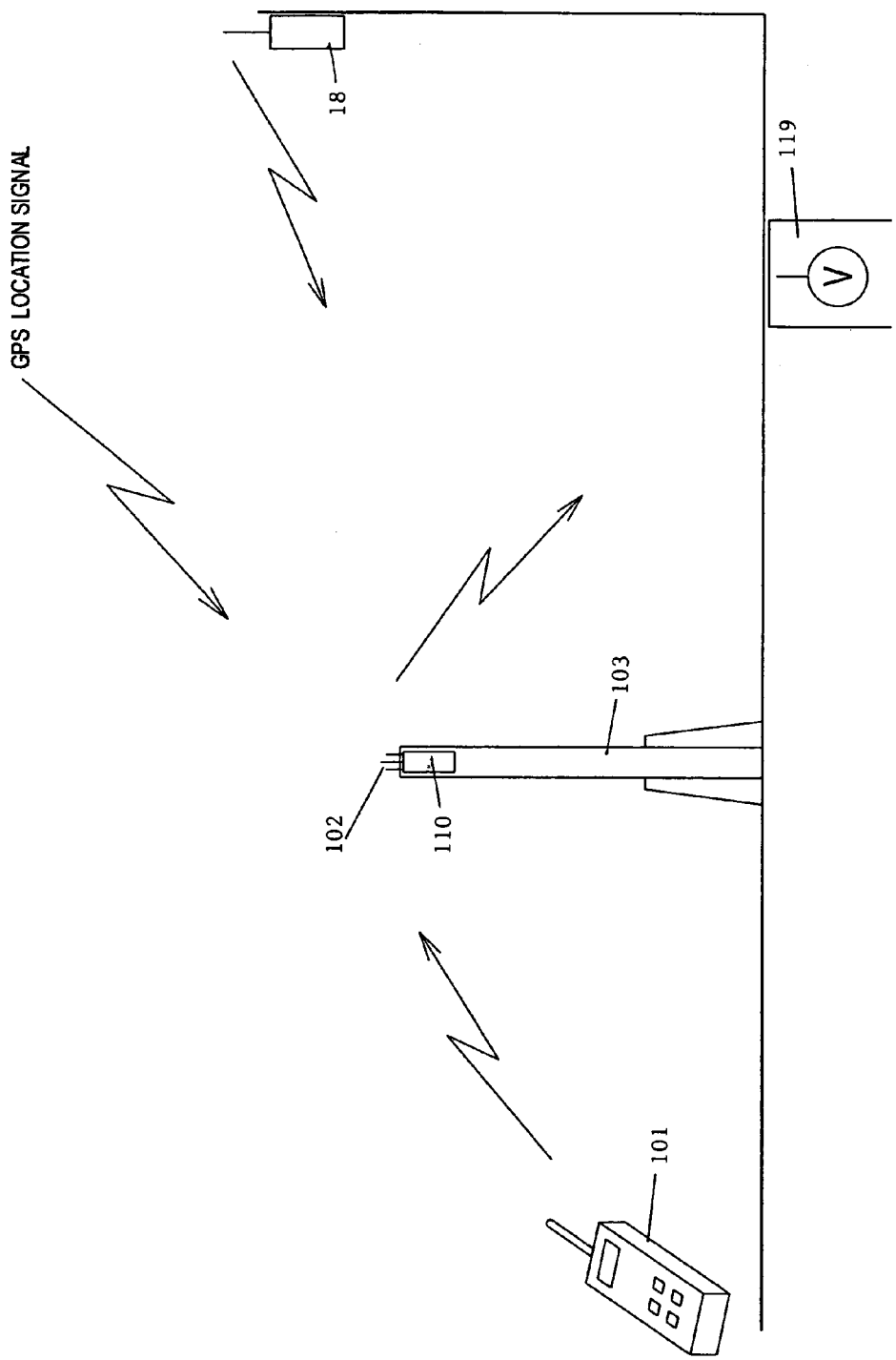
FIG. 7 is a diagram showing wireless programming, wireless rain and temperature sensor input, GPS input, and wireless control signal to valves remotely located from the controller.

FIG. 7 shows the block diagram for a wireless embodiment. The programming is accomplished by means of a hand held or other remote unit 101. The controller 110 is mounted at a location such as on top of either a pipe or galvanized pole, on top of a decorative lamp post, on a wall or mounting post 103, inside a valve box, etc. The radio receiver antenna 112 is mounted adjacent to the controller. The rain switch 118 and temperature sensor 117 can either be mounted with the controller, or remotely located at a central point that can provide temperature and rain sensor data to a number of controllers in the area. The GPS data can be received by the same receiver in the controller to enable the controller to determine its zip code, thereby determining its average summer high temperature and latitude, which in turn determines the extraterrestrial radiation value for that location throughout the year. The valves 104 under control of the controller 110 receive wireless signals from the controller to turn cutoff switches 119 on or off.

Alternatively, temperature, rain and/or other sensors may be mounted remotely from the controller, and the WBR or modified WBR calculation performed at this remote location. The WBR is then transmitted by wired or wireless means to one or more controllers located within the wired or wireless range of the transmitter. If the WBR is calculated at the remote sensor(s) location, the controller(s) do not have to store or process the geo-environmental data, but merely receive this data and adjust their irrigation schedules based on this information. The remotely located apparatus that stores and processes the geo-environmental data, senses temperature and/or rain (or other environmental conditions), calculates the WBR, and transmits the WBR is referred to as a CBM (Central Broadcast Module).

Figure 8:
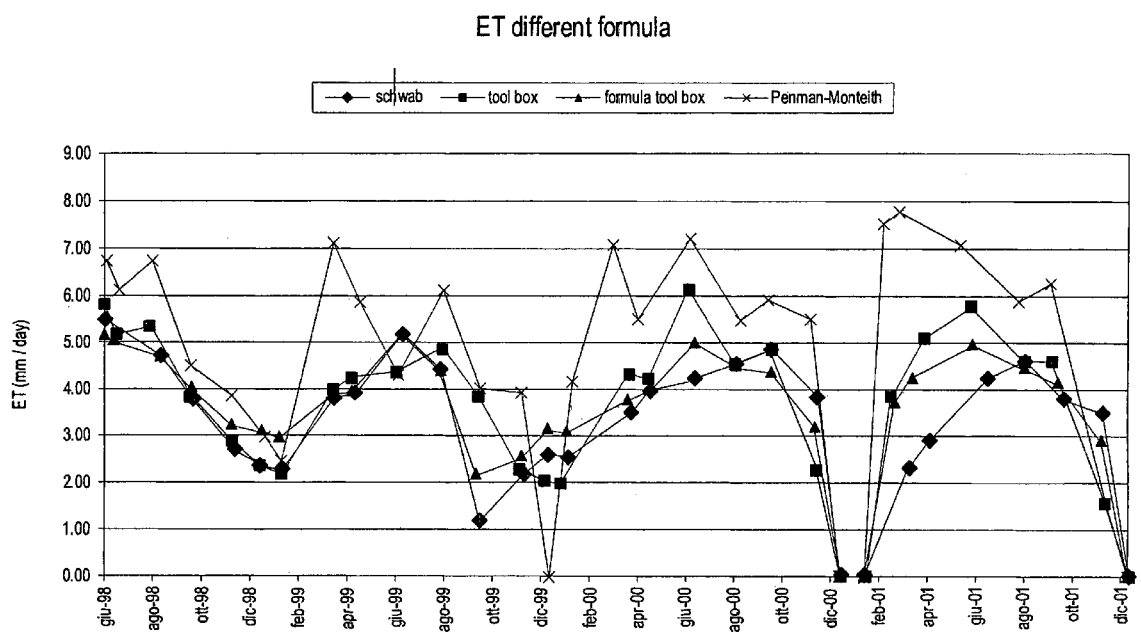
FIG. 8 is a chart comparing the theoretical ET calculations of four ET formulas as compiled by Cattaneo and Upham.

FIG. 8 shows the comparison of four different recognized ET formulas as compiled by Catteano and Upham-The Schwab, the tool box, the formula tool box, and the Pennman-Monteith. This comparison was done with the same data over a four year period from 1998 to 2001 and is depicted in 2 month increments. The difference is that each formula uses different meteorological parameters. As can be noted, the most recognized Pennman-Monteith formula varies by as much as 70% from the other three equations at certain times of the year, bringing into question which ET formula (if any) is correct.

FIGS. 9 and 10 show test results for the months of September and October 2005 from a controller using the temperature budgeting approach of the present invention. The results verify that the temperature budgeting methods of the present invention closely approximates the analytical study depicted in FIG. 1 comparing the key parameters of "Irrigation Adequacy" and "(controller) "Scheduling Efficiency" which incorporates runoff, deficit, and surplus irrigation figures. For the six irrigation zones tested, temperature budgeting averaged better than 98% of ET during September and October. According to the California Department of Water resources, results within 20% of ET are acceptable for controllers as a means of water conservation. It is to be noted that the efficiency of the overall system is limited by the efficiency of the sprinklers used (which are not the subject of this invention), and that the efficiency using the temperature budgeting methods of the present invention closely tracks the efficiency of the sprinkler. Stated differently, it is the sprinklers that reduce the overall efficiency reported in these tests, not the methods of the present invention.

Figure 11:
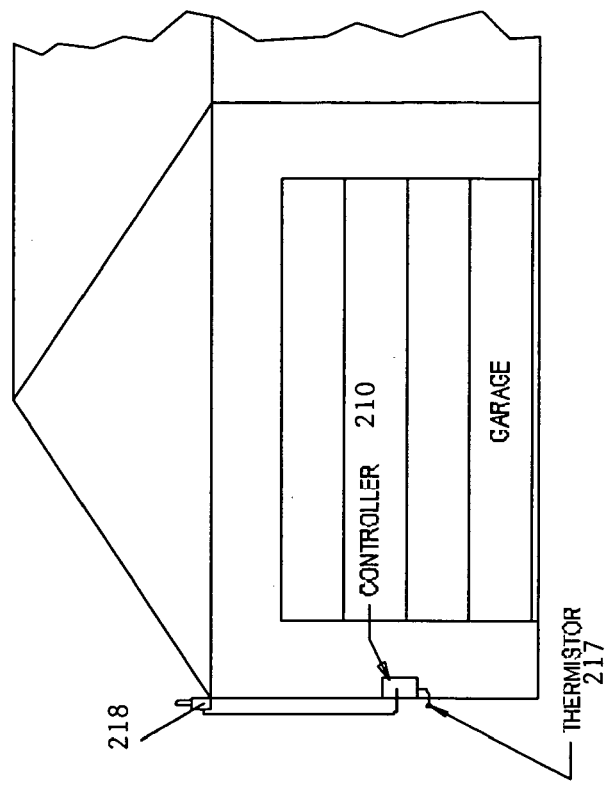
FIG. 11A is a diagrammatic illustration of a simple embodiment of the present invention including a temperature sensor thermistor bead mounted outside a garage hard wired to a controller inside the garage providing the controller with temperature data.
FIG. 11B is the embodiment of FIG. 11A with the optional rain switch wired to the same controller in the garage.
Figure 11:
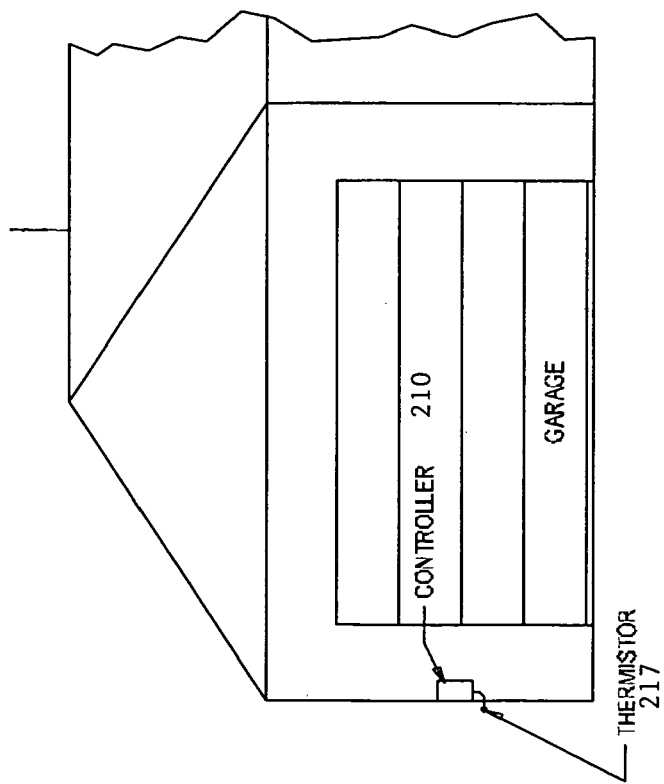

FIG. 11A illustrates a very simple embodiment of the present invention. An AC powered irrigation controller 210 is mounted inside a residential garage. A temperature sensor bead, which could be a simple thermistor 217, is mounted directly outside the garage wall where it can obtain a good ambient temperature reading. It could also be mounted at the eave of a garage away from sun loading effects of the garage wall. This temperature sensor directly communicates with the controller providing the controller with periodic or constant temperature readings from which the controller can calculate the WBR. In this simple embodiment, only an inexpensive temperature sensor with a two conductor cable is the hardware is needed. The AC controller software needs to be modified to accommodate the average summer high temperature and the extraterrestrial radiation values with which to calculate the WBR.

FIG. 11B illustrates the same general setup as shown in FIG. 11A, with the addition of an optional rain switch 218. While the rain switch is not an integral part of this invention, it is recommended for optimum water conservation. Other environmental sensors may also be implemented in these embodiments, as desired by the user.

Figure 12:
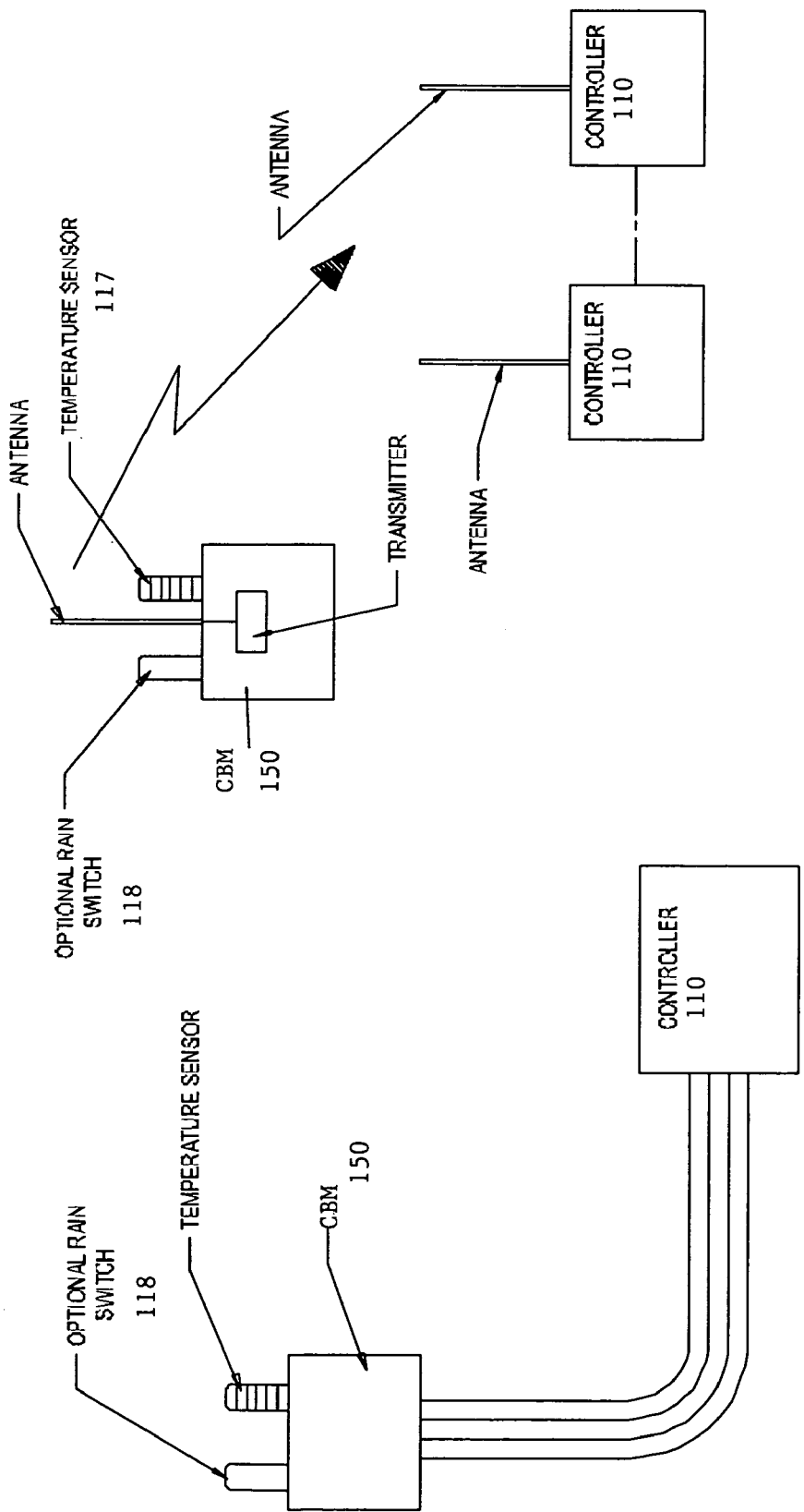
FIG. 12A is a diagrammatic illustration of a Central Broadcast Module (CBM) with an optional rain switch mounted on the outside of a residential garage sending the WBR data to the controller in the garage.
FIG. 12B is a diagrammatic illustration of the CBM module of FIG. 12A mounted on a light, sign, or telephone pole wirelessly communicating to a commercial controller, AC or DC powered.

FIG. 12A shows an embodiment of a CBM 150 with the optional rain switch 118 with wired communication to a controller 110. In residential applications, the CBM would be typically mounted on the eave of a garage and hard wired to the controller inside the garage. The advantage of this method is that the controller software changes would be minimal to accommodate the WBR or $WBR_M$ data without the need for zip code or latitude or average summer high temperature data memory storage requirements. The CBM provides the information necessary to automate the manual water budget feature already present in most controllers. This version of the CBM typically only communicates with a single controller in a garage in residential applications.

FIG. 12B shows the CBM mounted in a convenient location where it has access to a good ambient temperature reading. The CBM would typically (but not necessarily) be battery powered with a transmitter and antenna in addition to a microprocessor with data storage and the ability to calculate the WBR. The WBR data is periodically transmitted (wired or wirelessly) to one or more controllers 110 and used to automatically adjust its water budget.

Figure 13:
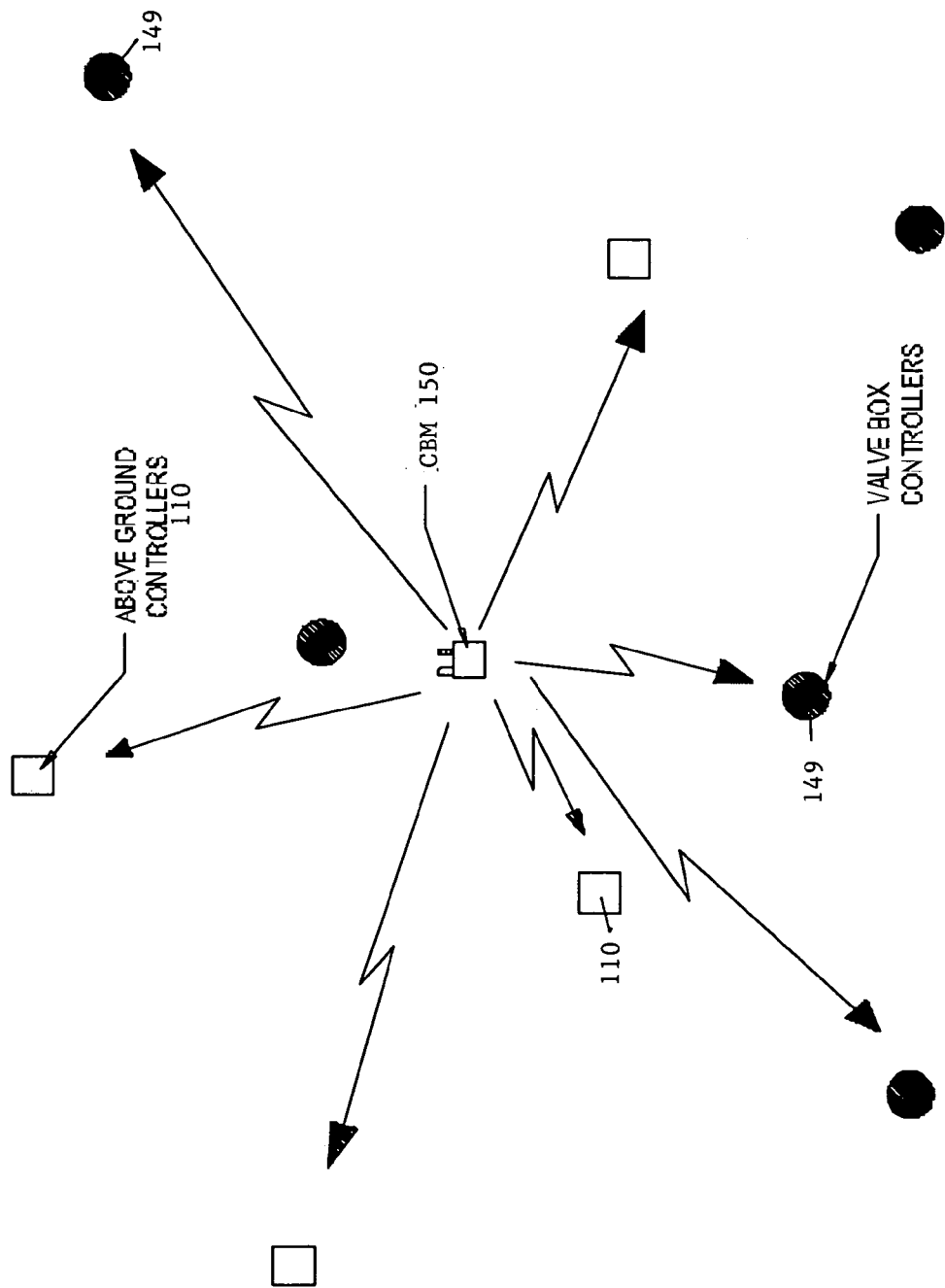
FIG. 13 illustrates a remotely located CBM that transmits the wireless or wired WBR or $WBR_M$ data to a number of remotely located receivers/controllers that can be AC or DC, solar, or ambient light powered.

FIG. 13 demonstrates a broader embodiment of the present invention. Here, a CBM 150 is mounted in a park, school, or apartment complex, for example at an elevated location such as a pole or on top of a building. It records ambient temperature and may also include a rain, wind, humidity, solar, or other sensors which are used to calculate a $WBR_M$ which can then be transmitted to a number of controllers 110 remotely located within radio or other wireless communication range of the module 150. This method can be used to broadcast the WBR signal to battery powered valve box controllers 149, above ground battery or solar or ambient light powered controllers, or AC powered controllers. The CBM in this embodiment becomes the central control unit that provides the adjustment factor (WBR or $WBR_M$) for the watering duration times for the controller irrigation schedules. No weather sensor data is directly wirelessly sent to the controllers. The CBM merely transmits a percentage (the water budget ratio—WBR) to the field remote or slave controllers. In a broad embodiment of FIG. 13, the CBM is located in a large area (parts of a city, for example) that adjusts the irrigation settings for many residential and commercial controller users, and has the ability to turn off irrigation systems if the $WBR_M$ indicates a percentage of 0.

Figure 14A:
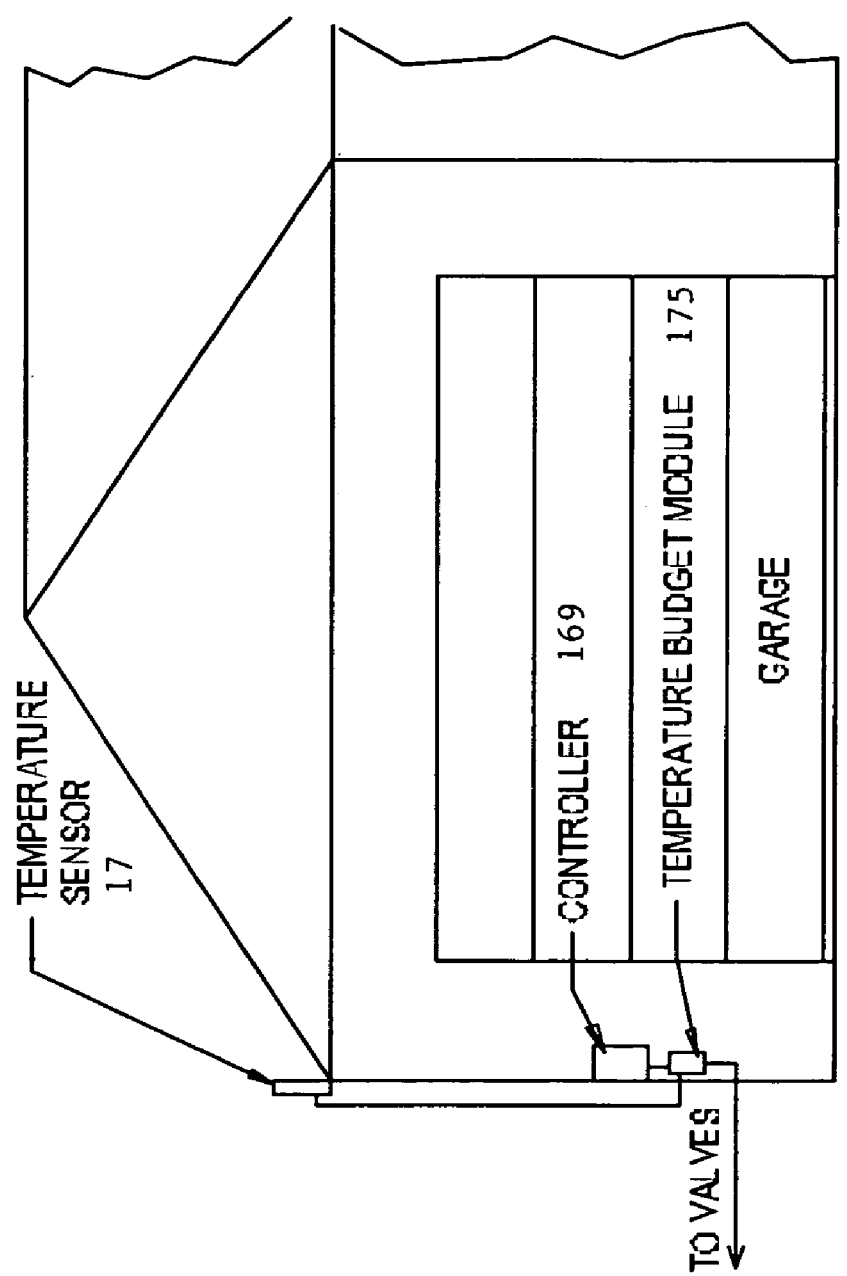
FIG. 14A is a diagrammatic illustration of a typical residential application with one embodiment of a TBM connected to an existing AC powered controller.

FIG. 14A shows an existing AC powered residential controller 169 inside a garage. The temperature and optional rain switches 17, 18 are mounted outside the garage on an eave, for example, and their signal wires come into the garage to a temperature budget module (TBM) 175 which is connected between the controller station outputs and the field wires leading to the switches or valves. Each controller station output is subjected to the WBR or $WBR_M$ produced by the TBM. The power to the cutoff switches or valves (e.g. 24V AC) is turned off when the WBR time is attained for each station. This method allows the use of any existing irrigation controller without the objectionable service fee normally required for ET based systems such as provided by AccuWater, ET Water Systems, HyroPoint's Weather TRAK, or Irrisoft's Weather Reach.

Figure 14D:
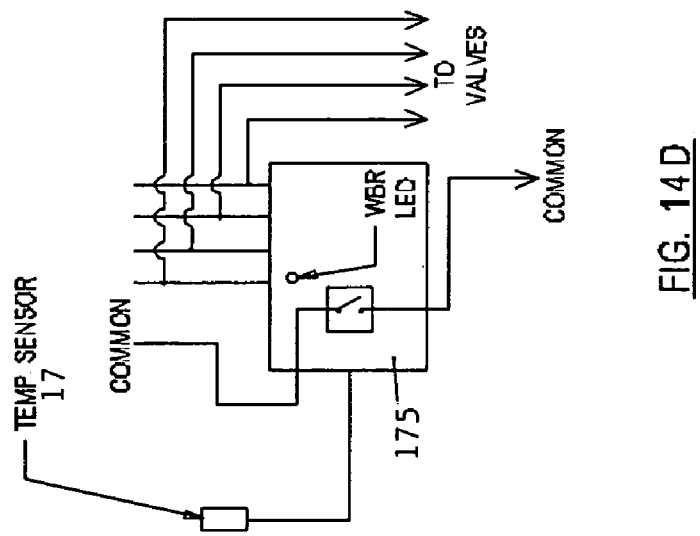
FIG. 14D is a schematic diagram of a simplified TBM showing breaking the common
Figure 14C:
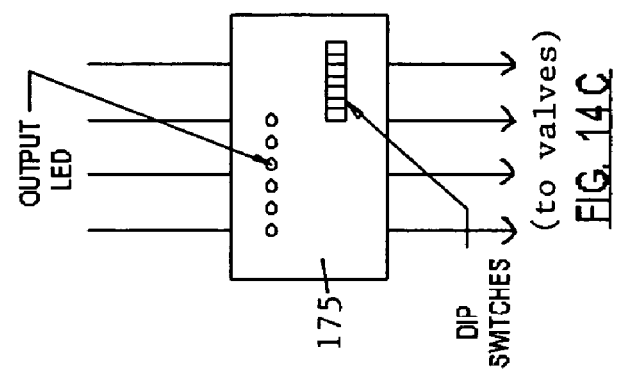
FIG. 14C is a detailed view of the TBM of FIG. 14A.
Figure 14B:
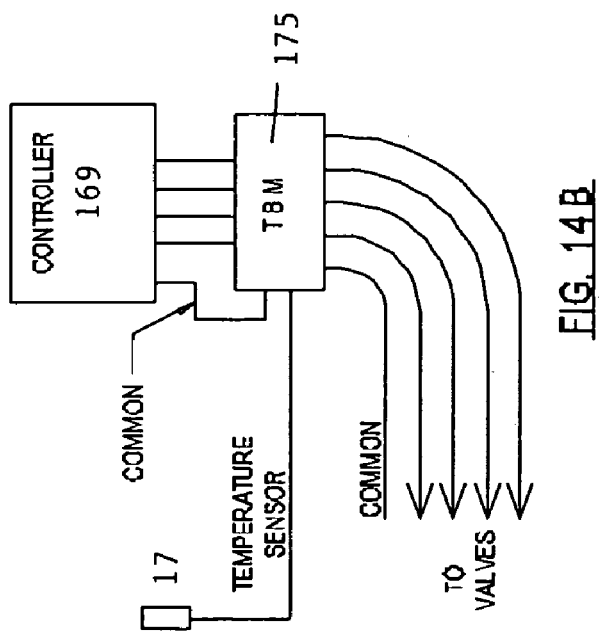
FIG. 14B is a detailed view of the wiring of the TBM module of FIG. 14A.

FIG. 14B shows detail of an embodiment of the TBM of FIG. 14A illustrating a typical setup of an AC controller with four station outputs and their common. The controller outputs are inputted to the TBM 175 where they are monitored by the TBM microprocessor. In this version, each output is independently enabled by the TBM and shut off when the WBR is reached, allowing multiple simultaneous valve operation.

FIG. 14C is a detailed view of an embodiment of the TBM of FIGS. 14A or 14B showing exemplary programming dip switches and exemplary output LEDs which may indicate, for example, the on/off status of each valve.

FIG. 14D illustrates an alternative version of a TBM that may be used when only one valve is to be operated at a time. When the WBR is reached on a station, the common line is opened, discontinuing irrigation with that valve. This would, of course, also discontinue operation of any other valves if they were in operation. Upon the completion of the summer run time for this station, the common is closed, allowing the next station to operate until its calculated WBR is reached, at which time the common is again opened, and so on, with the rest of the outputs. This simplified method is not recommended where multiple programs are active because the opening of the common would interfere with other valves in operation. However, most residential controllers would normally have only one station active at a time due to their limited water supply and pressure. This simpler design costs less to manufacture and is easier to install. The optional rain switch would be placed in series with the module. In case of rain, all outputs could be further shortened, or disabled with the $WBR_M$ calculation.

Figure 14E:
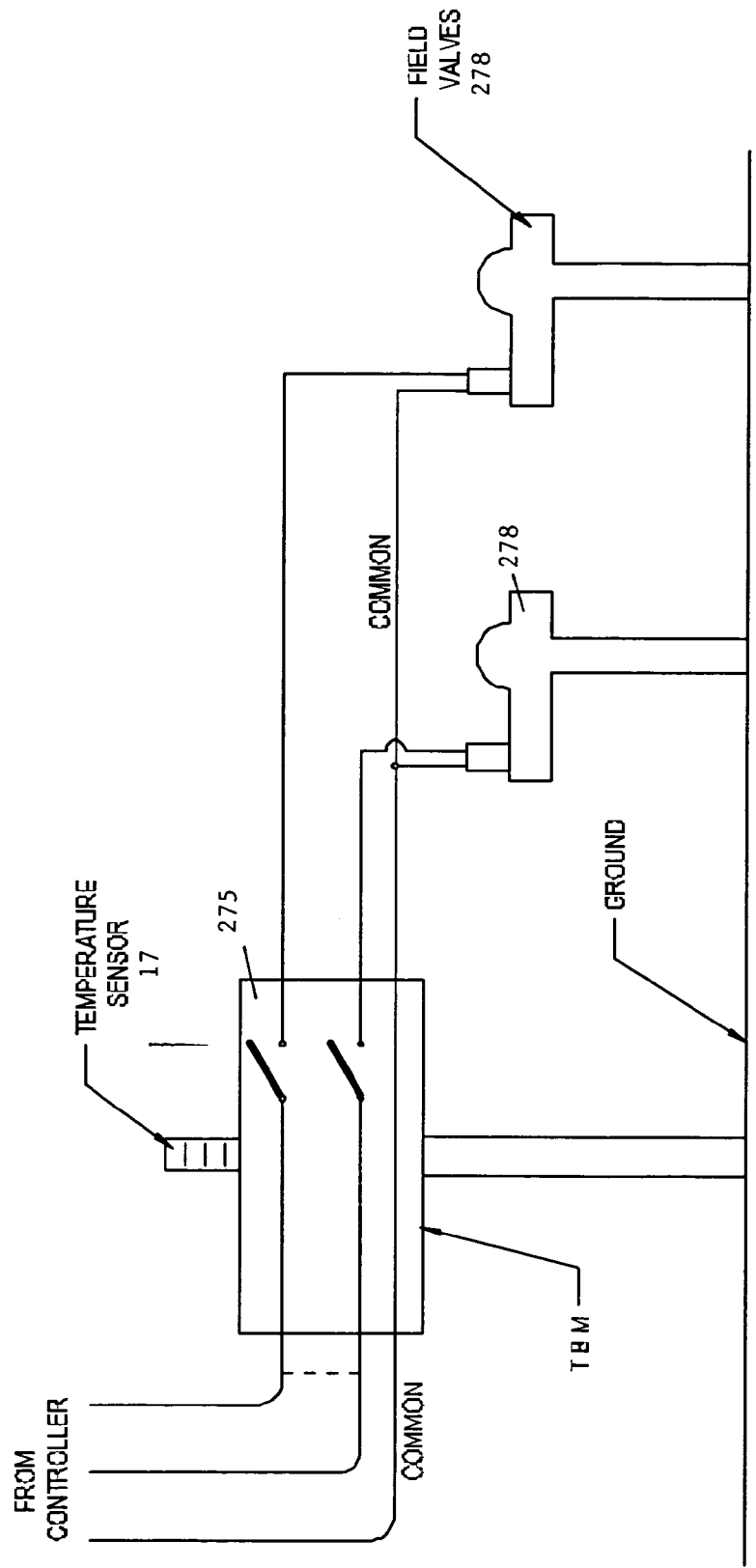
FIG. 14E is a schematic diagram of a typical TBM mounted between the controller and the valves with independent control of individual valves
Figure 15:
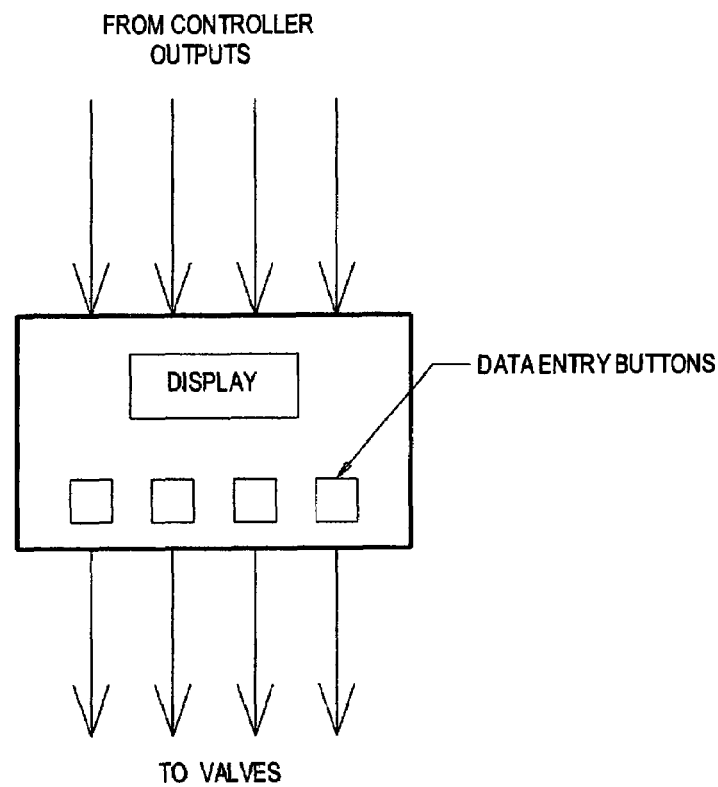
FIG. 15A illustrates an alternative embodiment of the present invention having display and data entry switches.
FIG. 15B illustrates an alternative embodiment of the present invention having display and data entry switches.
Figure 15:
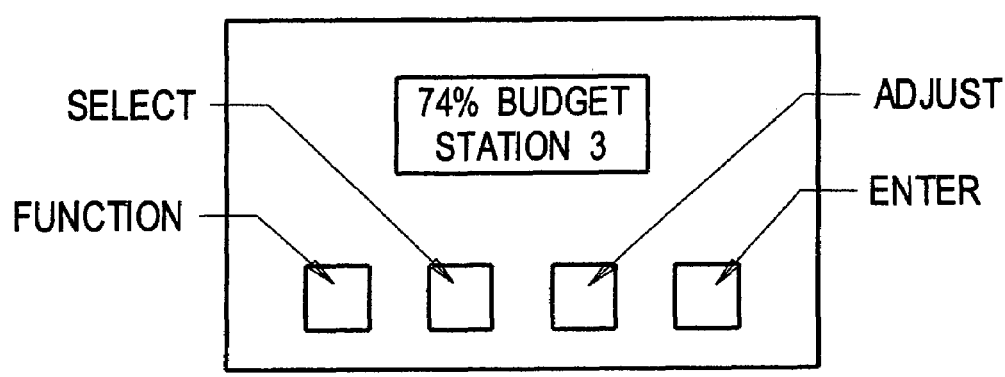
Figure 4:
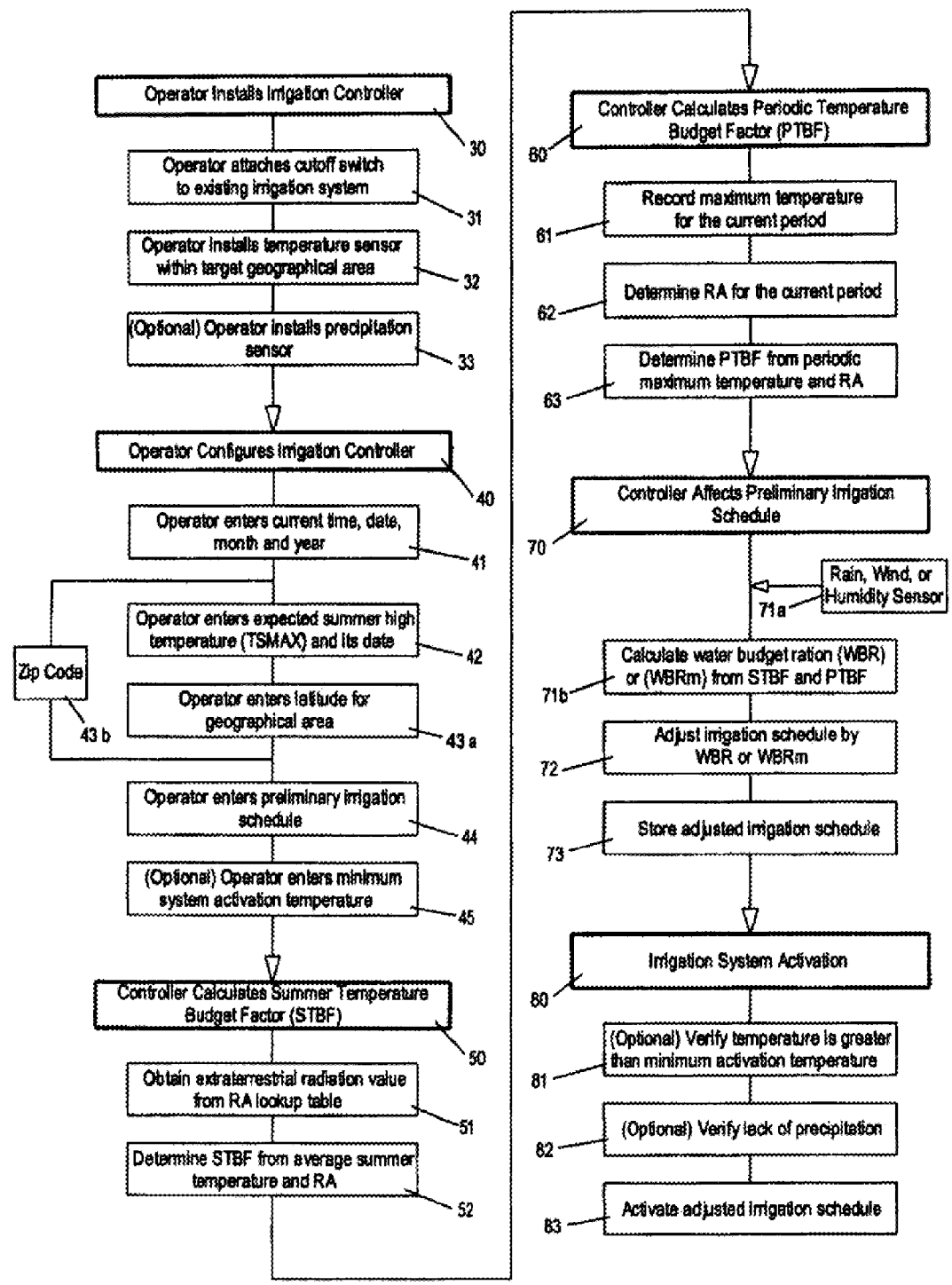

FIG. 14E shows an embodiment of a TBM 275 mounted remotely from a controller, at a valve 278 or a bank of valves (two valves are shown). In the preferred embodiment of such a valve-mounted TBM, the TBM is battery powered. Technology developed by this inventor allows a single 3.6 volt lithium battery to operate such a module for the life of the module (10 years) without need for replacement. The TBM may be pre-programmed with its local zip code based PRISM data providing it with its latitude and average summer high temperature. This allows the TBM to calculate its STBF. With its self-contained temperature sensor 17, and its periodic temperature readings, and its internal calendar (which determines the varying RA factor throughout the year), the PTBF is calculated. The module is therefore capable of calculating a daily WBR. Following a "training" or "learning" cycle described previously, upon the receipt of a 24 VAC valve output from the controller, the TBM determines when the WBR percentage of irrigation time is reached, and terminates the irrigation of that valve. Multiple valves can be independently budgeted in this manner.

FIRST EXAMPLE OF THE PRESENT INVENTION IN PRACTICE

The following example is provided for illustrative purposes only and without limiting the appended claims. This example assumes that the operator has already determined the preliminary irrigation schedule using any number of commonly available methods, such as personal experience, or from the system designer.

Assume for the purpose of this example that an irrigation controller embodying the present invention is to be installed in Fresno, Calif., at 10:15 a.m. on Feb. 15, 2004. This can be a residential AC powered controller, or a commercial AC, DC (battery), solar, or ambient light powered controller. The operator installs the controller and enters the current time, date, month and year. (S)he then enters the local zip code. The display appears as follows:

| | |
|---|---|
| Current Time/Date: | 10:15 AM Feb. 15, 2004 |
| Controller location zip code: | 93711 |

The controller determines from the zip code that the local latitude is 36 N. From its lookup table, it determines that the July RA factor at that latitude is 16.7. From the PRIZM data, the microprocessor determines that the average July high temperature in Fresno for the last 30 years is 96 F. This makes an STBF of 16.7×96=1603.

Assume that the date is now November 2. The recorded high temperature for the previous period (twenty-four hours herein) was 52° F. The controller lookup table based upon the local zip code indicates that the Fresno RA on this particular day is 7.7. This means that the PTBF is 400 (the temperature of 52° F., multiplied by the RA of 7.7). Dividing the PTBF by the STBF provides a WBR value of approximately 0.249. The irrigation duration for this particular period will be decreased to approximately 1.5 minutes of water (the 6 minute initial irrigation schedule, multiplied by the WBR value of 0.249=1.49 minutes of water), thrice per day.

The operator could also program the controller to suspend irrigation if the temperature at the beginning of an irrigation cycle is below the specified minimum temperature, or (if a precipitation sensor is included) if precipitation exists during, or before, an irrigation cycle. For example, assume that precipitation exists during the second watering irrigation time above. The precipitation sensor detects the existence of such precipitation, and communicates such existence to the controller, causing the controller to cancel the previously scheduled second watering duration of 1.5 minutes. Further assume that the minimum temperature is set at 35° F. Further assume that, at the beginning of the third irrigation time above, the current temperature was 34° F. This would cause the controller to cancel the previously scheduled third watering duration of 1.5 minutes.

SECOND EXAMPLE OF THE PRESENT INVENTION IN PRACTICE

In this example, there is no user input to the controller(s) in terms of the zip code, nor is there a requirement for the controllers to store any historical geo-environmental data. Without the need for storing this significant additional data, there generally will be no need for hardware changes such as additional memory storage, nor significant software changes since most controllers already have a manual water budgeting method in use. This example discusses two versions of this application. Both calculate the WBR remotely and transmit it to controllers in the field. In the case where the rain/temperature module is battery powered, it can use technology developed by the present inventor to conserve battery energy, or the battery life can be augmented by means of a small solar panel at the sensor.

The CBM includes a microprocessor with adequate data storage, a wireless transmitter (most likely radio, but other wireless means are suitable), and a temperature sensor. A rain switch is not an integral part of this invention, but effective to maximize water conservation. Typically, this assembly is mounted on a light pole or on top of a building such that it can transmit readily and reliably to every controller within its perimeter. The area covered could be a school, park, golf course, apartment complex, or a series of street medians. The controllers could be valve box controllers with the capability of wireless programming, or above ground controllers mounted on walls, posts, residential AC powered units inside garages, or in a pedestal with an external antenna.

In one embodiment, the CBM containing the WBR calculating microprocessor is pre-programmed with the local geo-environmental data (latitude, and average summer high temperature). This can be accomplished in a number of ways. One way is by downloading the latitude and average high temperature from a hand-held wired or wireless unit with its stored zip codes as described previously. Another way is by means of a set of dip switches on the CBM. These switches (or sets of switches) can be set with the current month or calendar (for the RA factor); additional dip switch (es) may set the latitude; and/or other(s) may provide the average summer high temperature. The temperature sensor monitors the ambient temperature periodically and reports the recorded high temperature of a previous time frame (e.g. over the last 24 hours) to the WBR microprocessor. The extraterrestrial radiation (RA) factor for that particular day is multiplied by the high temperature recorded during the previous time frame and divided by the STBF. This results in the WBR. If it has rained of sufficient amount to activate the rain switch, that information is also supplied to the microprocessor. The remote WBR or $WBR_M$ is transmitted to the controllers within the applicable area. In one embodiment, the controllers receiving this $WBR_M$ data could be addressed individually for separate controller recognition. The controllers receive and process the $WBR_M$ to determine whether to budget or suspend their individual irrigation schedules.

In a broader version of this second example of an application of a remotely and centrally calculated WBR, a city or community could broadcast a universal WBR signal to every controller in its area. Every controller with wireless reception capability could receive this information and determine whether to be water budgeted and/or shut down in case of a rain event, or a low temperature condition, or an excessive wind condition. As an analogy, there are currently capabilities to shut air conditioners within zones in cities to help control the peak hours of air conditioning demand to preserve the capabilities of the power grids. Similar to air conditioning controls, areas of cities could be transmitted the WBR and/or rain shut down commands.

The CBM itself could be programmed by using a hand held wireless programmer, or by manual data entry means such as with the dip switches previously described. The CBM in effect becomes the central controller with self-contained geo-environmental data and temperature, rain, humidity, or wind sensors or the like, that provides information to its field satellite "slave" controllers which use that information to determine if and when and how much to irrigate. It is to be appreciated that in these embodiments, no sensor data such as a rain switch or wind switch contact change is directly transmitted to controllers. The sensor data is provided to the CBM microprocessor by hard wire connection within the sensor module, and is used by the central processor to calculate a WBR or $WBR_M$ factor. That CBM becomes in effect a central controller that disseminates a water budget ratio in the form of a percentage of irrigation run times to its satellite controllers.

As an alternative to transmitting a complete shutdown signal (i.e. a $WBR_M$ of 0), in some instances, it may actually be preferable to have a very small ESF, that results in a small $WBR_M$ that is not 0. It is generally not desirable in certain parts of the country to have the entire irrigation system shut down for extended periods of time (weeks or months). The prolonged dormancy of irrigation systems could cause the rubber diaphragms within the valves to become less elastic during this time, and to cause the solenoid plungers to become calcified or rusted during the winter months. These detrimental effects could require significant maintenance at the beginning of the irrigation season and cause severe irrigation inefficiencies until the problems are detected and corrected. In this regard, the water budget ratio methods offers the solution to reduce the watering durations to a point much lower than the normal WBR, with the application of an ESF factor of 0.1, for example instead of 0, the valves are actually actuated for very brief periods of time (seconds) which is enough to operate the valves, have water flow through the, piping, and exercise the solenoids and diaphragms, thereby improving the irrigation efficiency and minimizing maintenance at the start of the normal irrigation season. A few seconds of valve operation will not cause significant waste of water, as this would, be easily recovered with improved system efficiency at the start of the irrigation season.

This simple, intuitive, cost-effective, user-friendly approach encourages significantly higher long-term consumer participation, making it possible to save most of the wasted landscape water and subsequent runoff, which in California would be over one million acre feet. The additional infrastructure and environmental benefits of this water conservation have previously been enumerated by the EPA, as described herein.

It is to be appreciated that in alternative embodiments, one or more (or all) of the temperature, precipitation, and rain sensors may be physically separated from the controller itself, and may communicate with the controller via wire or wireless or radio communications.

It is to be appreciated that in alternative embodiments, user input to the controller may be provided directly through a keypad or other input device on the controller, or by using a wireless or radio programming device with the controller having a receiver/transmitter to accept and report such input.

THIRD EXAMPLE OF THE PRESENT INVENTION IN PRACTICE

This example deals with a residential application. The exemplary controller in this example is AC powered and the output to the valves is 24 VAC, although other controllers may be used in an analogous fashion. The controller can be any existing pre-installed conventional one (not having "smart" technology, existing or new). The temperature sensor and optional rain switch are mounted on the eave of the garage and the wires come into the garage as shown in FIG. 14A. The controller may be programmed with its summer irrigation schedule any time of the year for the purpose of this initial temperature budgeting setup. If the TBM is self-DC powered (batteries, solar, etc.), the local zip code and day of month and month may be entered into the TBM by one of any several means already discussed (e.g. dip switches) for convenience, such that the TBM may be pre-programmed with this information prior to the time of installation. If the TBM is not DC powered, it may receive its power from the 24 VAC transformer normally supplied with the controller so that the zip code and month and day information may be supplied to the unit after power up. Once programmed, an internal EPROM memory retains the programmed information in case of power failure. In the case where the TBM is powered with the controller AC, loss of power for short periods of up to one day would not significantly affect the WBR calculating ability of the TBM since the STBF is fixed for a particular zip code, and the RA factor used with the PTBF calculation does not vary significantly from day to day. However, prolonged lack of power would be detrimental since it would result in the inability to update the WBR based on recent temperature readings that could vary significantly from one day to the next.

To install this exemplary embodiment, the wires from the output of the controller to the valves are disconnected from the controller outputs. The controller outputs are instead connected to the TBM inputs using wires, a cable w/connector, or the like, plugged into the controller outputs. The previously disconnected valve wires, including the common, are connected to the outputs from the TBM. Ordinarily, no watering will be wanted during set up, so the common wire to the field from the TBM is disconnected (or not yet connected). The summer irrigation program already in the controller is activated and each station output (e.g., 24 VAC signal) is monitored by the TBM and their times recorded in the TBM microprocessor memory—the TBM "learns" the irrigation schedule. If this is done with the common line disconnected, after the module, no watering occurs during the "learning" phase. Upon completion of the summer irrigation cycle, the installer or homeowner reconnects the common to the valves. The TBM monitors the temperature from the temperature sensor and performs the PTBF and WBR calculations. Upon the next start of an irrigation cycle, each station output is monitored. When the WBR (percentage) of duration time is reached for each station, those stations are turned off by the TBM (e.g. by opening the line to the valve, or opening the common).

Since the summer schedule is normally the highest percentage during the course of the year, the WBR will almost always be less than 100% of the summer duration. A WBR over 100% may cause an overlap over another operating station. It may or may not be hydraulically efficient to have more than one valve on at a time. If this is not desirable, for example if the water supply or pressure is inadequate to support two valves at a time, the TBM may be programmed to limit the WBR to the 100% allocated. If an overlap is acceptable, where the TBM has 24 VAC available to it from the controller power supply, the TBM may extend the time while the overlapping station goes on as directed by the controller. This independent monitoring and activation of individual stations allows for multiple programs to run concurrently.

Simplified versions of the TBM are also envisioned. While independent enabling outputs in the module allow for multiple program operation, this practice is not normally done in residential applications for the reasons cited above of limited water supply and operating pressure. In the cases where there are no simultaneous valve operations, the TBM can be simplified as follows: the outputs from the controller are still monitored. However, instead of enabling the individual output means, such as triacs or relays, when the WBR time duration on a station is reached, the common line is opened, terminating (all) valve operation. Once the 100% station duration is reached, the common is reconnected, allowing the next valve in sequence to operate until its WBR time duration is reached, and so on, until all the stations have completed their irrigation durations. See FIG. 14D. This design costs less to manufacture and has improved reliability due to its significantly decreased component count.

To allow for manual testing of certain valves for maintenance purposes, a TBM bypass means may be provided to allow fully timed manual activation without disrupting the maintenance function. Upon reversing the bypass, the WBR monitoring is resumed.

There are several advantages to temperature budgeting with a TBM over ET add on modules:

1. Since the TBM is pre-programmed with its calendar, programming the TBM may be as simple as entering the local zip code.
2. The TBM is compatible with all existing and new 24 VAC output controllers, of which there are over 2.5 million sold each year, and tens of millions in current use.
3. The TBM is very inexpensive to build, flexible, and qualifies for most government water conservation rebate programs.
4. There are no electrical safety issues with the TBM since it works with class 2 circuits which are considered safe by Underwriters Laboratories standards.
5. The TBM is easy to install and maintain.
6. There are no service fees associated with the TBM, which is a major drawback of other ET "add on" systems.

FOURTH EXAMPLE OF THE PRESENT INVENTION IN PRACTICE

Other embodiments of the temperature budgeting methods and apparatus are suitable for all applications: residential, commercial, or turf. In these embodiments, the irrigation schedule of any valve may be adjusted without making hardware or software changes to the controller in use. The valves, solenoids, and the wiring going to the valves are also largely unaffected, except for the installation of the TBM near the solenoids. Exemplary versions of the embodiments of the invention for these methods are described below, and shown in FIG. 14E.

In these embodiments, a TBM is housed in an outdoor (weather proof) enclosure. A temperature sensor is housed within a case in a manner ventilated to provide an accurate ambient temperature reading, in communication with the TBM. Ordinarily, the TBM is battery powered (because of its remote location near the valves), although other empowering means are possible such as a solar panel, or water flow or wind generated power—or AC, if available. Having an internal battery allows the module to be pre-programmed with its calendar and its local zip code and minimum irrigation temperature for convenience prior to installation. Or, the module may be provided with a means for programming the local zip code with, for example, dip switch(es), wireless programming, etc. As an example for entering the zip code via dip switches, dip switch could be set for zip code programming and the zip code entered as follows: (a) flip the numbered position on the dip switch corresponding with the first digit of the zip code to the "on" position for one second, then off; (b) flip the second digit of the 5 digit zip code for to "on" one second then off; (c) continue until all 5 digits are entered; (d) return the zip code programming dip switch to its "off" position. The 5 digit zip code is now programmed into this module. As described above, the zip code allows the unit to determine the local latitude and average summer high temperature for that location. The calendar day and month may be pre-programmed at the factory, or at the time of installation. A deviation of a few hours from the actual time will not significantly affect the RA factor daily selection.

If a minimum irrigation temperature is desired, it may be programmed wirelessly, as above, with a second dip switch that is labeled, for example, "min irr temp," or by other local means. For example, the same 10-position dip switch used to program the zip code may now be used to enter the minimum irrigation temperature, in conjunction with a mode switch (which could be a toggle or second dip switch) indicating whether the input is a zip code, a minimum temperature, or something else. Thus, if the desired minimum temperature is 36 F, in one embodiment a mode switch is set to indicate that the input is a minimum temperature; then the "3" switch on the 10 position switch is set to "on" then "off", followed by the same with the "6"switch.

Once the module is pre-programmed, it can be mounted on the valve(s) themselves, or separately such as on a short post or stake above ground next to the valves. If vandalism is a concern, the TBM can be mounted inside a cage that is commonly used to protect the controllers or backflow preventors. The wiring from any AC powered controller to the valves is interrupted by the module. Modules for any number of stations can be made available. One module can handle from one station to 8 for typical residential applications, or virtually an unlimited number for larger commercial applications. The common line and each of the solenoid lines from the controller are inputted to the module, and then output to the valves as shown in FIG. 14E. The microprocessor monitors the power (e.g. 24 VAC) from the controller output and "learns" the summer programmed run time for each station the first time each output is energized, as described previously. Starting with the next start of each station, the WBR is calculated and limits the timing of each station based upon that day's WBR.

The TBM itself may be modular. A base unit may incorporate the microprocessor with its PRISM data, zip code entry means, its temperature sensor, and battery. To this base unit, small modules may be plugged in to accommodate any number of individual modules which simply consist of output relays or triacs with their driving circuits and output indicator LEDs. These outputs may be plugged into their base or mother board. In these embodiments, the customer orders exactly the number of stations needed without unnecessary cost for unused stations.

For an example of temperature budgeted watering with one of these embodiments of the TBM, assume that the summer time for station 1 is 10 minutes, for station 2 (on a drip system) is 1 hour, and station 3 (on bubblers) is 14 minutes. If the WBR for that day is calculated at 80%, then station 1 valve will be cut off by the module after 8 minutes of watering, station 2 after 48 minutes, and station 3 after about 11 minutes. With independent station output control, any number of stations can be operated simultaneously if the water supply and pressure permit it. This is one of the limitations of currently available ET add-on modules for most commercial applications in that the common to all valves is cut off at one time.

If a minimum irrigation temperature is programmed, the microprocessor in the TBM checks the current or latest temperature reading to verify that it exceeds the set temperature. If it is below that temperature, it disables all the outputs and no irrigation occurs. If this feature is not programmed or the temperature is above the minimum point, it proceeds with its WBR function.

In a slight variation of this remote TBM method with respect to minimum irrigation temperature, the TBM may be programmed to inhibit irrigation if the maximum temperature of the previous day does not reach a set point. This implies that it was not warm enough to allow for a significant amount of evaporation and plant transpiration to warrant irrigation. This is common in winter in some parts of the country that allows for the shutting off of irrigation for weeks at a time.

An override may be provided in the TBM to allow for manual operation of valves for maintenance purposes. A reset mechanism may also be provided in the TBM to clear the microprocessor memory of the zip code, minimum temperature, etc.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A method for operating an irrigation controller comprising the steps of:
   a. providing said controller with a preliminary irrigation schedule for a geographic location;
   b. computing a water budget ratio by comparing non-evapotranspiration current local geo-environmental data with stored non-evapotranspiration local geo-environmental data, wherein said stored local geo-environmental data comprises a table of extraterrestrial radiation (RA) values arranged by date and by approximate latitude;
   c. determining the approximate latitude for the geographic location using one of the following: GPS, cell phone, pager, wireless programming device, or directly wired hand held programming; and
   d. modifying said preliminary irrigation schedule based upon said ratio.

2. The method of claim 1 comprising the additional step of determining the average summer high temperature for the geographic location using the approximate latitude and said stored local geo-environmental data.

3. A method for operating an irrigation controller comprising the steps of:
   a. providing said controller with a preliminary irrigation schedule for a geographic location;
   b. inputting a zip code for said geographic location;
   c. computing a water budget ratio by comparing current local geo-environmental data with stored local geo-environmental data which does not include evapotranspiration data by
      1. computing a standard temperature budget factor;
      2. computing a periodic temperature budget factor; and
      3. dividing said periodic temperature budget factor by said standard temperature budget factor; and
   d. modifying said preliminary irrigation schedule based upon said ratio.

4. The method of claim 3 wherein the computation of both said standard temperature budget factor and said periodic temperature budget factor utilize an extraterrestrial radiation value from said stored local geo-environmental data.

5. the method of claim 3 comprising the additional steps of inputting a current date, inputting an expected maximum temperature and inputting a time frame for said expected maximum temperature.

6. The method of claim 3 wherein the controller automatically determines an expected maximum temperature and a time frame for said expected maximum temperature based upon the zip code.

7. The method of claim 6 wherein the step of computing the standard temperature budget factor includes multiplying the expected maximum temperature by an extraterrestrial radiation value for the time frame of said expected maximum temperature.

8. The method of claim 3 wherein said stored local geo-environmental data comprises an expected average maximum temperature during the summer months.

9. The method of claim 8 wherein said current local geo-environmental data is collected over a period of twenty-four hours.

10. The method of claim 3 wherein the step of computing said periodic temperature budget factor includes multiplying an actual recorded maximum temperature taken over a previous predetermined time period by an extraterrestrial radiation value for said geographic location during said period.

11. The method of claim 1 comprising the additional step of programming said controller to water an irrigation area according to said modified irrigation schedule only upon the occurrence of a predefined environmental event.

12. The method of claim 11 wherein said predefined environmental event comprises the lack of rainfall within a predefined period of time.

13. The method of claim 11 wherein said predefined environmental event comprises a current temperature exceeding a predefined minimum irrigation temperature.

14. A method for automatically operating an irrigation controller comprising the steps of:
   a. providing said controller with a current date, a local zip code, and a preliminary irrigation schedule;
   b. determining an approximate latitude and average summer high temperature based on the zip code;
   c. computing a water budgei ratio from current local geo-environmental data and stored local geo-environmental data comprising the steps of:
      1. computing a standard temperature budget factor from said stored local geo-environmental data by multiplying the aVerage summer high temperature by an extraterrestrial radiation value for a time frame of said average summer high temperature at said approximate latitude,
      2. computing a periodic temperature budget factor by multiplying an actual recorded maximum temperature taken over a previous predetermined period by an extraterrestrial radiation value at said approximate latitude during said particular period, and
      3. computing said water budget ratio by dividing said periodic temperature budget factor by said standard temperature budget factor; and
   d. modifying said preliminary irrigation schedule based upon said ratio.

15. The method of claim 14 wherein said modification of said preliminary irrigation schedule comprises multiplying said preliminary irrigation schedule by said water budget ratio.

16. The method of claim 14 comprising the additional step of programming said controller to water an irrigation area according to said modified irrigation schedule only upon the occurrence of a predefined environmental event.

17. The method of claim 16 wherein said predefined environmental event comprises the lack of rainfall within a predefined period of time.

18. The method of claim 16 wherein said predefined environmental event comprises a current temperature exceeding a predefined minimum irrigation temperature.

19. An apparatus for automatically adjusting irrigation watering schedules, comprising:
   a. a microprocessor with data storage and instructions for computing a water budget ratio using non-evapotranspiration geo-environmental data;
   b. an input device in communication with said microprocessor;
   c. at least one environmental sensor in communication with said microprocessor;
   d. a power source for said microprocessor; and
   e. at least one irrigation water control switch in communication with said microprocessor.

20. The apparatus of claim 19 wherein said input device is remotely programmable.

21. The apparatus of claim 19 wherein said at least one switch is wirelessly operated by said microprocessor.

22. The apparatus of claim 19 wherein said data storage comprises a table of extraterrestrial radiation values arranged by date and by approximate latitude.

23. The apparatus of claim 22 wherein a temperature sensor is provided in communication with said microprocessor, and wherein said instructions for computing a water budget ratio comprise dividing a periodic temperature budget factor by a standard temperature budget factor.

24. The apparatus of claim 23 wherein said microprocessor computes said periodic temperature budget factor by multiplying an actual recorded maximum temperature taken by said temperature sensor over a previous predetermined period and an extraterrestrial radiation value at an approximate latitude during said period, and wherein said microprocessor computes said standard temperature budget factor by multiplying an expected maximum temperature by an extraterrestrial radiation value for a time frame of said expected maximum temperature at said approximate latitude.

25. The apparatus of claim 19 further comprising at least one wireless environmental sensor.

26. The apparatus of claim 19 wherein said power source comprises at least one battery.

27. A method for operating an irrigation controller comprising the steps of:
   a. providing said controller with a preliminary irrigation schedule;
   b. providing said controller with a latitude and average high summer temperature using a global positioning system and stored historical data;
   c. computing a water budget ratio by comparing current local geo-environmental data with stored local geo-environmental data wherein said stored data does not include evapotranspiration data; and
   d. modifying said preliminary irrigation schedule based upon said ratio.

28. An apparatus for automatically adjusting irrigation watering schedules, comprising:
   a. a microprocessor with data storage having instructions for computing a water budget ratio using current local non-evapotranspiration geo-environmental data and stored local non-evapotranspiration geo-environmental data;
   b. an input device in communication with said microprocessor;
   c. at least one temperature sensor in communication with said microprocessor;
   d. a power source for said microprocessor; and
   e. at least one irrigation water output control switch in communication with said microprocessor.

29. The apparatus of claim 28 further comprising a global positioning system.

30. The apparatus of claim 29 further comprising stored historical geo-environmental data.

31. The apparatus of claim 28 wherein said input device is a wireless programming module.

32. An irrigation controller comprising:
   a. a microprocessor with data storage and programming to calculate a water budget without using evapotranspiration data;
   b. a wireless input device in communication with said controller;
   c. at least one environmental sensor in communication with said controller;
   d. a power source for said controller; and
   e. at least one water output control switch in communication with said microprocessor.

33. A battery operated irrigation controller comprising:
   a. a microprocessor with data storage and programming to calculate a water budget without using evapotranspiration data;
   b. a wireless input device in communication with said controller;
   c. at least one environmental sensor in communication with said controller;
   d. a battery power source for said controller; and
   e. at least one water output control switch in communication with said microprocessor.

34. An irrigation controller comprising:
   a. a global positioning system;
   b. a microprocessor having a clock and data storage in communication with said global positioning system, said microprocessor having programming to calculate a water budget without using evapotranspiration data;
   c. at least one environmental sensor in communication with said controller;
   d. a power source; and
   e. at least one water output control switch in communication with said controller.

35. A method for adjusting a controller irrigation schedule comprising the steps of:
   a. producing a ratio by dividing (i) a measured high temperature for a current time period multiplied by a current extraterrestrial radiation factor by (ii) a stored summer high temperature multiplied by a stored extraterrestrial radiation factor; and
   b. modifying said irrigation schedule by said ratio.

36. A battery powered controller comprising:
   a. At least one battery power source;
   b. A microprocessor with data storage and programming to calculate a water budget ratio without using evapotranspiration data; and
   c. At least one water control switch.

37. A method of adjusting station run times in an irrigation controller comprising the steps of:
   a. calculating a water budget ratio by comparing non-evapotranspiration based current geo-environmental data with stored geo-environmental data; and
   b. adjusting said run times based upon said ratio.

38. A method of altering an irrigation schedule comprising the steps of:
   a. calculating a water budget ratio for a geographic location by comparing non-evapotranspiration based current geo-environmental data with stored geo-environmental data;
   b. modifying said water budget ratio according to data from at least one environmental sensor; and
   c. adjusting said irrigation scheduled according to said modified water budget ratio.

39. The method of claim 38 wherein the steps of the method are performed by a controller, and data from said at least one sensor is transmitted wirelessly to said controller.

40. The method of claim 38 wherein said modified water budget ratio is communicated to at least one controller.

41. A method of altering the watering cycles of at least one irrigation controller comprising the steps of:
   a. providing a microprocessor at a remote location with historical non-evapotranspiration based geo-environmental data;
   b. taking at least one, current temperature reading;
   c. calculating a water budget ratio using said microprocessor by comparing said historical data with said current reading;
   d. transmitting said water budget ratio to said at least one irrigation controller.

42. The method of claim 41 comprising the additional step of modifying the water budget ratio with a reading from at least one additional sensor.

43. The method of claim 42 wherein said at least one additional sensor is selected from the group consisting of: wind sensor, relative humidity sensor, rain sensor, solar radiation sensor, and combinations thereof.

44. A central irrigation control comprising:
   a. a microprocessor with data storage and programming to calculate a water budget ratio without using evapotranspiration data;
   b. a power source for said microprocessor;
   c. a temperature sensor in communication with said microprocessor;
   d. a wireless transmitter in communication with said microprocessor for transmitting said water budget ratio to at least one remotely located irrigation control unit.

45. In combination, the central irrigation control of claim 44 and at least one remotely located irrigation control unit wherein each such unit is capable of receiving said water budget ratio and using said ratio to modify watering cycles under the control of such unit.

46. The control of claim 44 further comprising at least one additional sensor selected from the group consisting of: wind sensor, relative humidity sensor, rain sensor, solar radiation sensor, and combinations thereof.

47. An apparatus for affecting an irrigation schedule of at least one valve operated by a valve controller comprising:
   a. a module connected to said controller, said module comprising:
      1. a microprocessor having non-evapotranspiration based geo-environmental data, and having programming to calculate a water budget without using evapotranspiration data;
      2. at least one input for electrical connection to at least one controller output;
      3. at least one output for electrical connection to at least one irrigation valve; and
      4. a power supply for said module; and
   b. a temperature sensor in communication with said module.

48. The apparatus of claim 47 further comprising a water budget override.

49. The apparatus of claim 47 further comprising a zip code input device.

50. The apparatus of claim 47 further comprising at least one weather sensor selected from the group of: a rain, wind, relative humidity, solar, and combination thereof.

51. A method of affecting the watering cycles of an irrigation controller comprising the steps of:
   a. connecting a module having local historical non-evapotranspiration based geo-environmental data therein between said controller outputs and their corresponding valves;
   b. providing said module with current temperature information;
   c. calculating a water budget in said module by comparing said geo-environmental data with said temperature information;
   d. changing said watering cycles based upon said water budget.

52. A method of altering an irrigation cycle comprising the steps of:
   a. providing environmental data to a temperature budgeting module external to said controller, said data selected from the group consisting of: temperature, precipitation, wind, solar radiation, relative humidity, and combinations thereof;
   b. calculating a water budget in said module using said environmental data without using evapotranspiration data; and
   c. altering said irrigation cycle using said water budget.

53. A method of altering the operation of an irrigation system valve comprising the steps of:
   a. connecting a module having local historical non-evapotranspiration based geo-environmental data between a controller output and a solenoid of said valve;
   b. providing said module with current temperature information;
   c. calculating a water budget in said module by comparing said geo-environmental data with said temperature information; and
   d. Changing the operation of said valve based upon said water budget calculation.

54. The method of claim 53 comprising the additional step of monitoring for at least one of the following conditions, and changing the budget calculation based on information obtained from said monitoring: precipitation, wind, solar radiation, relative humidity, and combinations thereof.

55. An apparatus for altering the operation of a valve comprising:
   A module provided between a controller output and said valve, said module comprising:
   a. at least one input for communication with a controller output;
   b. at least one output for communication with said valve;
   c. A microprocessor with programming to calculate a water budget without using evapotranspiration data; and
   d. at least one environmental sensor.

56. The apparatus of claim 55 where the data input to said module is selected from the group consisting of a zip code, latitude, average summer high temperature, and combinations thereof.

57. A method for adjusting the watering schedule of at least one remotely located irrigation controller comprising the steps of:
   a. deploying a processing unit at a central location, said unit having programming to calculate a water budget ratio without using evapotranspiration data;
   b. providing said processing unit with latitudinal information regarding the central location;
   c. providing said processing unit with current temperature information;
   d. calculating a water budget ratio;
   e. providing the water budget ratio to said at least one controller; and
   f. changing the watering schedule of said at least one controller based on said water budget ratio.

58. The method of claim 57 wherein said water budget ratio is provided wirelessly to said at least one controller.

59. The method of claim 57 wherein a plurality of remotely located controllers receive said water budget ratio and change their watering schedules based on said ratio.

60. The method of claim 57 wherein the step of calculating said water budget ratio comprises the additional step of comparing said current temperature information with stored non-evapotranspiration based local geo-environmental data.

61. The method of claim 57 wherein the step of calculating said water budget ratio comprises the additional steps of:
   a. computing a standard temperature budget factor;
   b. computing a periodic temperature budget factor; and
   c. dividing said periodic temperature budget factor by said standard temperature budget factor.

62. A method for operating an irrigation controller comprising the steps of:
   a. providing said controller with a preliminary irrigation schedule for a geographic location;
   b. inputting a zip code for said geographic location;
   c. computing a water budget ratio by comparing current local geo-environmental data with stored local geo-environmental data which does not include evapotranspiration data; and
   d. modifying said preliminary irrigation schedule based upon said ratio.

63. The apparatus of claim 36 further comprising at least one weather sensor selected from the group of: temperature, precipitation, wind, relative humidity, solar, and combinations thereof.

64. A method for adjusting the schedule of at least one remotely located irrigation controller from a given location comprising the steps of:
   a. calculating a water budget ratio by comparing stored non-evapotranspiration geo-environmental data with current non-evapotranspiration geo-environmental data;
   b. providing said water budget ratio to said at least one remotely located controller; and,
   c. adjusting said schedule according to said water budget ratio.

65. The method of claim 64 comprising the additional step of using precipitation sensor input in calculating said water budget ratio.

66. The method of claim 64 comprising the additional step of using wind sensor input in calculating said water budget ratio.

67. An apparatus for providing a water budget ratio to at least one irrigation controller comprising:
   a. at least one environmental sensor;
   b. a microprocessor with means for calculating a water budget without using evapotranspiration data in communication with said at least one sensor; and
   c. a means for communication with said at least one controller.

68. The apparatus of claim 67 wherein said water budget ratio is provided to said at least one controller by one of wired or wireless means.

69. A method of adjusting a watering schedule of at least one irrigation controller comprising the steps of:
   a. calculating a water budget ratio externally from said at least one controller without using evapotranspiration data;
   b. communicating said water budget ratio to said at least one controller, and,
   c. adjusting said watering schedule according to said water budget ratio.

70. An apparatus for modifying the irrigation schedule of at least one controller comprising:
   a. a microprocessor with data storage and programming to calculate a water budget ratio without using evapotranspiration data;
   b. at least one environmental sensor in communication with said microprocessor; and
   c. a wireless transmitter in communication with said microprocessor for providing said water budget ratio to said at least one controller.

71. A non-AC powered irrigation controller comprising:
   a. a non-AC power source selected from the group of: at least one battery, at least one solar panel, at least one ambient light power source, and combinations thereof;
   b. a microprocessor having at least one input and at least one output with programming to calculate a water budget ratio by comparing stored non-evapotranspiration geo-environmental data to current non-evapotranspiration geo-environmental data, and
   c. at least one switch in communication with said at least one output.

72. The controller of claim 71 wherein said microprocessor receives input wirelessly.

73. The controller of claim 72 wherein said microprocessor receives input selected from the group of: a zip code, latitudinal information, an irrigation schedule, current temperature information, current precipitation information, current solar radiation information, current wind information, current humidity information, and combinations thereof.

74. The controller of claim 72 wherein said microprocessor communicates to said at least one switch wirelessly.

75. The controller of claim 71 further comprising at least one sensor in communication with said microprocessor, said sensor selected from the group of: temperature, precipitation, solar radiation, wind, humidity, and combinations thereof.

76. An apparatus for affecting at least one output of an irrigation controller comprising:
   a. a microprocessor having non-evapotranspiration based geo-environmental data and programming to calculate a water budget without using evapotranspiration data;
   b. at least one environmental sensor in communication with said microprocessor;

c. at least one input to said microprocessor in communication with at least one controller output; and
d. at least one output from said microprocessor in communication with at least one switch.

77. A method of altering a schedule of an irrigation controller comprising the steps of:
a. calculating a water budget ratio by comparing non-evapotranspiration current geo-environmental data with historical geo-environmental data; and
b. adjusting said irrigation schedule based upon said ratio.

78. An irrigation valve controller comprising:
a. at least one data input means;
b. a power supply;
c. at least one environmental sensor;
d. a microprocessor with programming to calculate a water budget by comparing stored non-evapotranspiration geo-environmental data to current geo-environmental data provided by said at least one sensor; and
e. at least one output in communication with at least one irrigation valve.

79. The controller of claim 78 wherein said environmental sensor is selected from the group of: temperature, wind, precipitation, humidity, solar radiation, and combinations thereof.

80. The controller of claim 78 wherein said power supply is selected from the group of: AC, DC, solar, ambient light, wind, water-generated power, wind-generated power, and combination thereof.

81. The controller of claim 78 wherein said data input means is selected from the group of: at least one data entry button, wireless, hard wired, pager, cell phone, and combinations thereof.

82. The controller of claim 78 wherein said at least one output communication is selected from the group of wired and wireless.

83. A method for adjusting at least one schedule of at least one remotely located irrigation controller comprising the steps of:
a. providing a microprocessor at a location with non-evapotranspiration geo-environmental data;
b. calculating a water budget ratio using said microprocessor by comparing said non-evapotranspiration geo-environmental data with current non-evapotranspiration geo-environmental data;
c. transmitting said water budget ratio to said at least one remotely located controller.

84. An apparatus for adjusting an irrigation schedule of at least one controller comprising:
a. a microprocessor with stored geo-environmental data and programming to calculate a modified water budget without using evapotranspiration data using at least one environmental sensor in communication with said microprocessor; and
b. a means for communicating said water budget to said at least one controller.

85. The apparatus of claim 84 wherein said communicating means is wireless.

86. The apparatus of claim 84 wherein power to said at least one controller is provided from the group of: battery, solar, AC, ambient light, and combinations thereof.

87. The apparatus of claim 84 wherein said environmental sensor is selected from the group of: temperature, wind, precipitation, humidity, solar radiation, and combinations thereof.

88. The apparatus of claim 84 wherein a power supply is provided for said microprocessor selected from the group of: AC, battery, solar, ambient light, wind, and combination thereof.

89. A method for altering a watering schedule of an irrigation controller comprising the steps of:
a. monitoring at least one output of said controller;
b. calculating a water budget ratio using stored and current geo-environmental non-evapotranspiration data; and
c. modifying said at least one output of said controller based upon said budget ratio.

90. An apparatus for altering at least one output from an irrigation controller comprising:
a. a module electrically connected to said at least one output;
b. at least one environmental sensor;
c. a microprocessor having water budget programming that does not use evapotranspiration data in communication with said at least one environmental sensor and with said output; and
d. at least one switch in communication with said microprocessor.

91. The apparatus of claim 90 wherein said environmental sensor is selected from the group of: temperature, precipitation, humidity, wind, solar radiation, and combination thereof.

92. A method for altering an irrigation schedule of at least one battery powered remotely located controller comprising the steps of:
a. providing a microprocessor at a location with geo-environmental data;
b. calculating a water budget ratio using said microprocessor without using evapotranspiration data;
c. transmitting said water budget ratio to said at least one remotely located battery powered controller; and
d. altering an irrigation schedule of said controller based upon said water budget ratio.

93. An apparatus for altering an irrigation schedule of at least one battery powered remotely located controller comprising:
a. a microprocessor with water budget calculating ability that does not use evapotranspiration data;
b. at least one environmental sensor in communication with said microprocessor; and
c. a wireless transmission means for providing a calculated water budget to said at least one remotely located controller.

94. An apparatus for altering an irrigation schedule of at least one battery powered remotely located controller comprising:
a. a microprocessor with water budget calculating ability that does not use evapotranspiration data;
b. at least one environmental sensor in communication with said microprocessor; and
c. a wireless transmission means for providing said water budget to said at least one remotely located controller.

95. A method of altering a watering schedule of at least one irrigation controller comprising the steps of:
a. calculating a water budget by comparing stored to current non-evapotranspiration geo-environmental data
b. providing said water budget to said at least one controller; and
c. altering a schedule of said at least one controller according to said water budget.

* * * * *

UNITED STATES PATENT AND TRADEMARK OFFICE
CERTIFICATE OF CORRECTION

| | |
|---|---|
| PATENT NO. | : 7,266,428 B2 |
| APPLICATION NO. | : 11/336690 |
| DATED | : September 4, 2007 |
| INVENTOR(S) | : George Alexanian |

It is certified that error appears in the above-identified patent and that said Letters Patent is hereby corrected as shown below:

Title page (57)
Abstract, lines 19-20: Replace "calculates the, water budget," with --calculates the water budget,--

Title page (56)
Page 2, line 9 under "Other Publications": Replace "Evapotran-piration" with --Evapotranspiration--

In the drawings, Sheet 4/16, Fig. 4: Replace "extraterrestrail" with --extraterrestrial-- in block referenced as 51. A Replacement Sheet is attached.

Column 4, Line 1: Replace "the. Center" with --the Center--

Column 6, Lines 64-66: Replace "task force established to propose new regulation concerning landscape irrigation has recommended" with --task force, established to propose new regulation concerning landscape irrigation, has recommended--

Column 8, Line 4: Replace "or RF interference" with --or RF (radio frequency) interference--

Column 8, Line 46: Replace "paticular" with --particular--

Column 9, Line 31: Replace "incommunication" with --in communication--

Column 10, Line 18: Replace "A/C" with --AC--

Column 11, Line 50: Replace "irrigation distributor" with --irrigation equipment distributor--

Column 12, Line 54: Replace "(typically the 24 VAC)" with --[typically the 24 VAC (Volts Alternating Current)]--

Column 13, Line 17: Replace "upon. the residential" with --upon the residential--

Column 17, Line 66: Replace "a central. processor" with --a central processor--

Column 24, Line 13: Replace "112" with --102--

UNITED STATES PATENT AND TRADEMARK OFFICE
CERTIFICATE OF CORRECTION

PATENT NO.        : 7,266,428 B2
APPLICATION NO.   : 11/336690
DATED             : September 4, 2007
INVENTOR(S)       : George Alexanian It is certified that error appears in the above-identified patent and that said Letters Patent is hereby corrected as shown below:

Column 25, Line 16:     Replace "is the hardware is needed." with --is the hardware that is needed.--

Column 28, Line 43:     Replace "If it has rained of sufficient amount" with --If it has rained a sufficient amount--

Column 29, Line 38:     Replace "would, be" with --would be--

Column 34, Line 54:     Replace "aVerage" with --average--

Column 34, Lines 63-65: Indent paragraph 3 to line up with paragraphs 1 and 2.

Column 36, Line 3:      Replace "haying" with --having--

Column 37, Line 15:     Replace "scheduled" with --schedule--

Column 37, Line 27:     Replace "at least one, current" with --at least one current--

Signed and Sealed this

Twenty-ninth Day of January, 2008

JON W. DUDAS
*Director of the United States Patent and Trademark Office*